United States Patent
Nakada

(10) Patent No.: US 10,868,975 B2
(45) Date of Patent: Dec. 15, 2020

(54) IMAGE PROCESSING SYSTEM FOR ACQUIRING AN IMAGE PICKED UP BY A CAMERA PROVIDED IN A VEHICLE AN IMAGE PROCESSING METHOD EXECUTED BY A COMPUTER AND A NON-TRANSITORY STORAGE MEDIUM STORING AN IMAGE PROCESSING PROGRAM EXECUTED BY A COMPUTER

(71) Applicant: TOYOTA JIDOSHA KABUSHIKI KAISHA, Toyota (JP)

(72) Inventor: Hiroshi Nakada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 263 days.

(21) Appl. No.: 15/909,332

(22) Filed: Mar. 1, 2018

(65) Prior Publication Data

US 2018/0262697 A1 Sep. 13, 2018

(30) Foreign Application Priority Data

Mar. 9, 2017 (JP) ................................. 2017-045351

(51) Int. Cl.
*G06K 9/32* (2006.01)
*H04N 5/262* (2006.01)
*B60K 31/00* (2006.01)
*G06T 3/40* (2006.01)

(52) U.S. Cl.
CPC ....... *H04N 5/2628* (2013.01); *B60K 31/0008* (2013.01); *G06T 3/40* (2013.01); *B60K 2031/0016* (2013.01); *B60K 2031/0025* (2013.01); *B60K 2031/0033* (2013.01); *B60K 2370/179* (2019.05); *G06T 3/4023* (2013.01)

(58) Field of Classification Search
CPC .......... H04N 5/2628; H04N 5/91; H04N 5/76; H04N 5/232; G06T 3/40; G06T 3/4023; B60K 31/0008; B60K 2370/179; B60K 2031/0016; B60K 2031/0033; B60K 2031/0025; B60R 2300/30; B60R 1/00
USPC ......................................................... 382/299
See application file for complete search history.

(56) References Cited

U.S. PATENT DOCUMENTS 9,350,914 B1 * 5/2016 Kaur ................... H04N 5/23229
2012/0151601 A1 * 6/2012 Inami ........................ G06T 1/00
726/26

(Continued)

FOREIGN PATENT DOCUMENTS

| CN | 102473283 A | 5/2012 |
|---|---|---|
| CN | 103731600 A | 4/2016 |
| JP | 2006178825 A | 7/2006 |

(Continued)

*Primary Examiner* — Andrew M Moyer
(74) *Attorney, Agent, or Firm* — Hunton Andrews Kurth LLP

(57) ABSTRACT

An image processing system includes: an image acquiring unit that acquires an image picked up by a camera, the camera being provided in a vehicle; and a quality changing unit that performs a quality changing process of decreasing a quality of the image to equal to or lower than a predetermined standard, based on at least one of a vehicle position at a time when the image is picked up, a vehicle position at a time when the image is output to an external device or a display device, and requestor information that indicates a requestor of an output request of the image.

19 Claims, 19 Drawing Sheets

(56) References Cited

U.S. PATENT DOCUMENTS

2014/0109231 A1   4/2014  Takaoka
2018/0189574 A1*  7/2018  Brueckner ......... H04N 5/23235

FOREIGN PATENT DOCUMENTS

JP    2008-191825 A   8/2008
WO      2012004907 A1  1/2012

* cited by examiner

FIG. 3

| EVENT ID | RECORDING AREA | IMAGE DATA | VEHICLE POSITION (PICKUP-TIME VEHICLE POSITION) |
|---|---|---|---|
| 000001 | RECORDING AREA B1 | IMAGE DATA C1 | ** |
| 000002 | RECORDING AREA B2 | IMAGE DATA C2 | ** |
| 000003 | RECORDING AREA B3 | IMAGE DATA C3 | ** |
| 000004 | RECORDING AREA B4 | IMAGE DATA C4 | ** |
| 000005 | RECORDING AREA B5 | IMAGE DATA C5 | ** |
| ... | ... | ... | ... |

FIG. 4A

| COUNTRY/REGION ID | PERMISSIBLE VALUE OF RESOLUTION [dpi] |
|---|---|
| 00000Y1 | A1 |
| 00000Y2 | A2 |
| 00000Y3 | A3 |
| 00000Y4 | A3 |
| 00000Y5 | A2 |
| ... | ... |

FIG. 4B

| USER ID | PERMISSIBLE VALUE OF RESOLUTION [dpi] |
|---|---|
| 00000X1 | A2 |
| 00000X2 | A2 |
| 00000X3 | A3 |
| 00000X4 | A3 |
| 00000X5 | A1 |
| ... | ... |

500

501

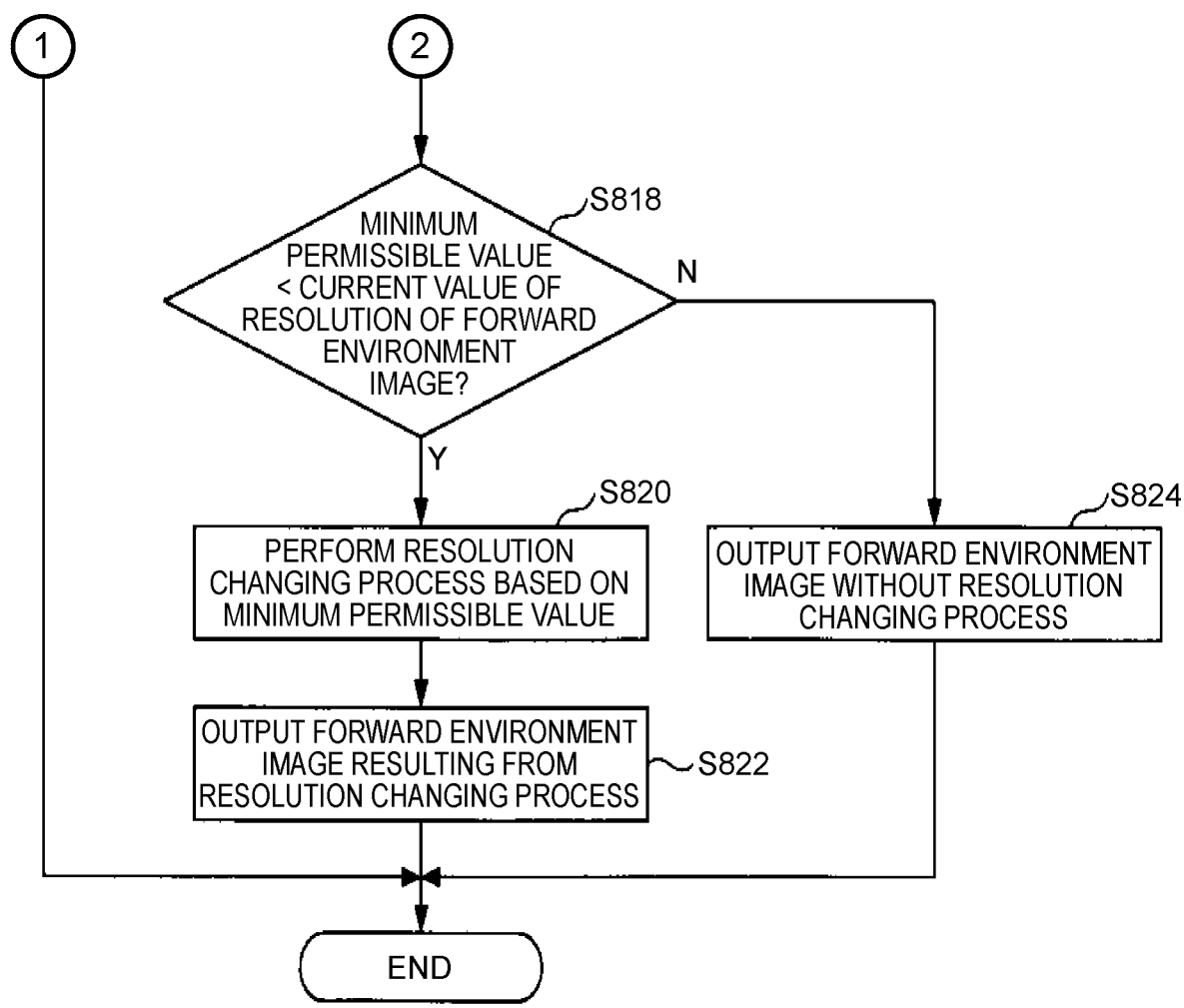

FIG. 13
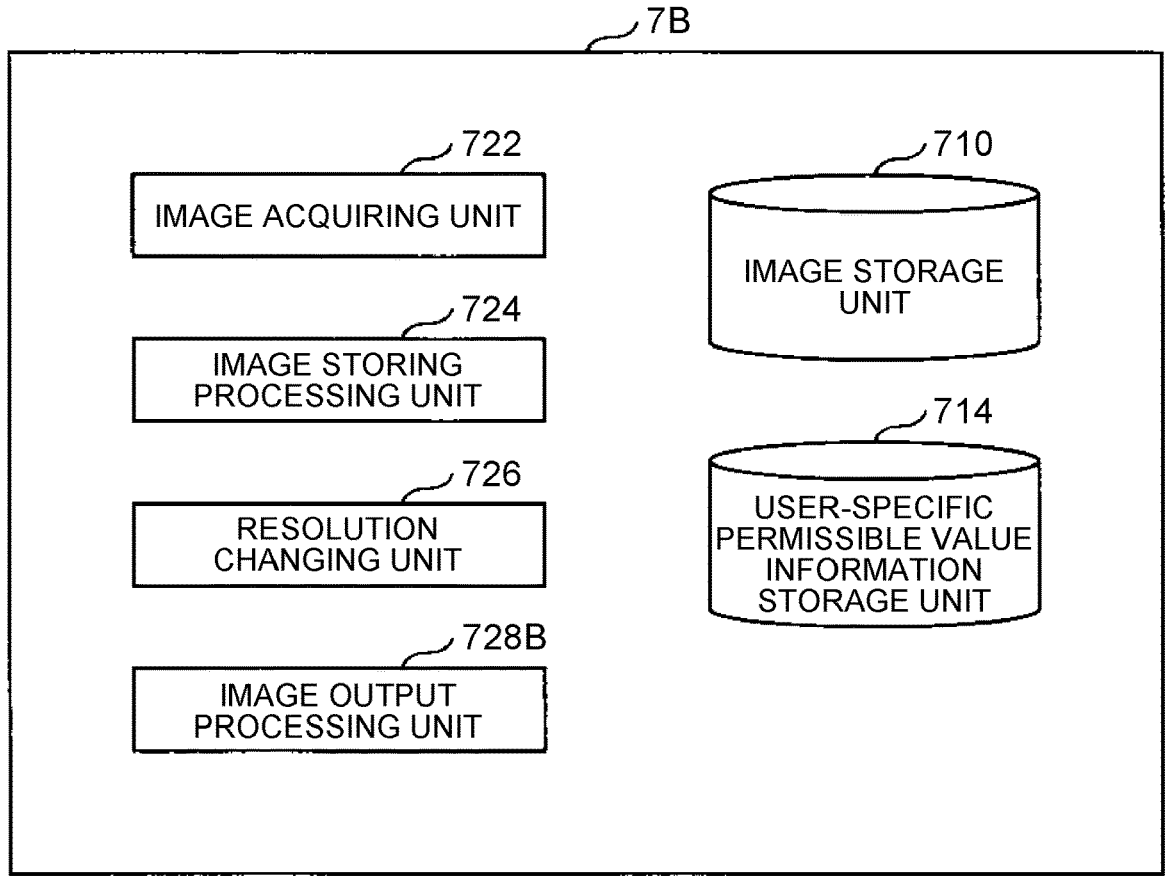
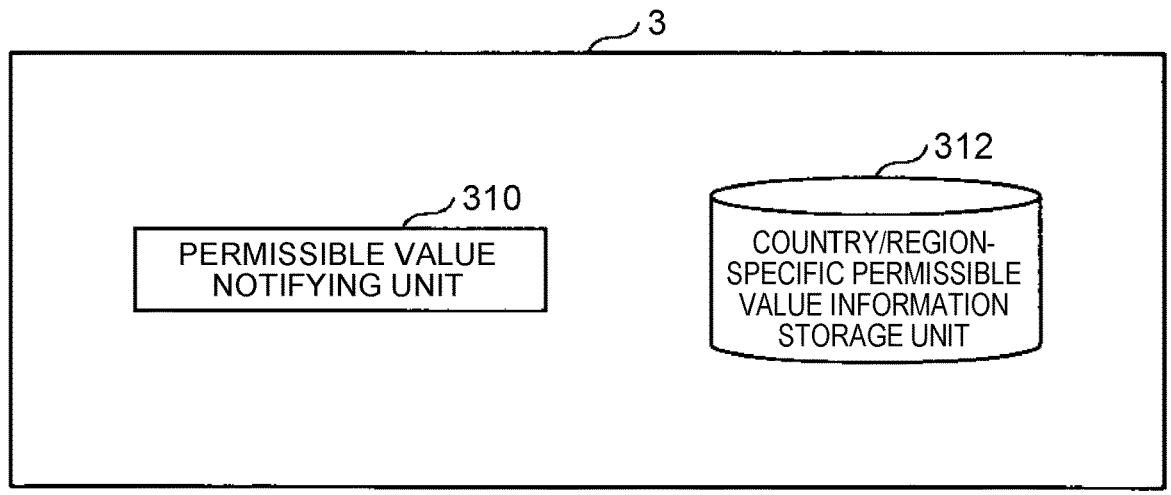

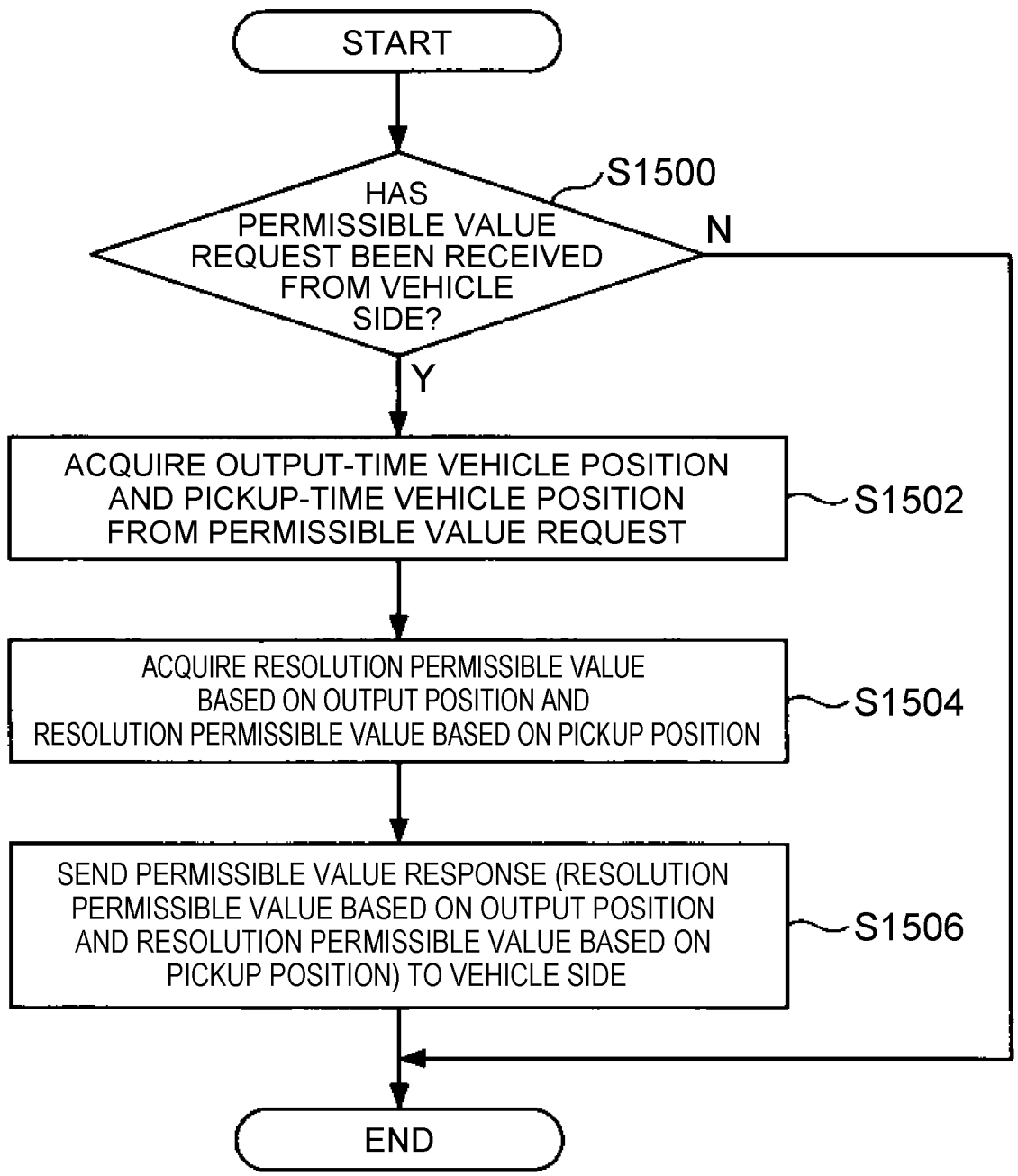

FIG. 16
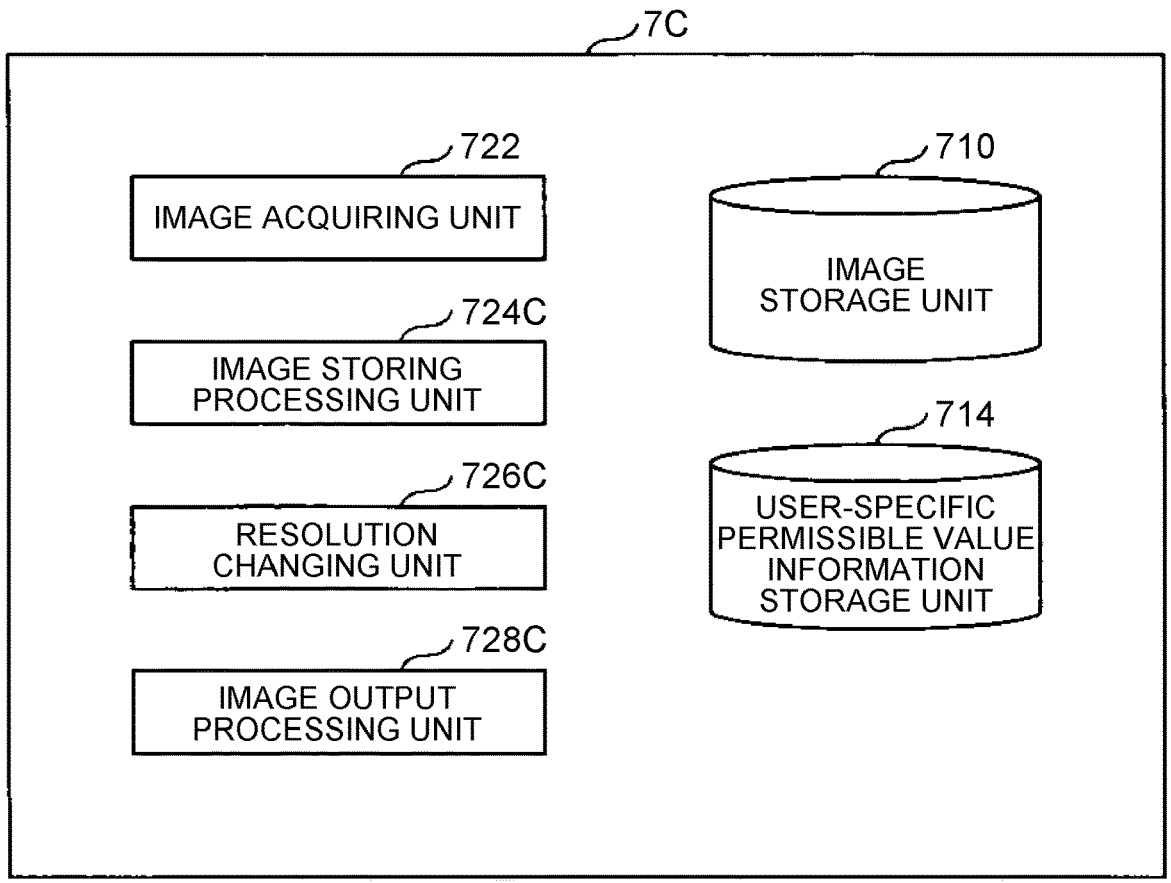
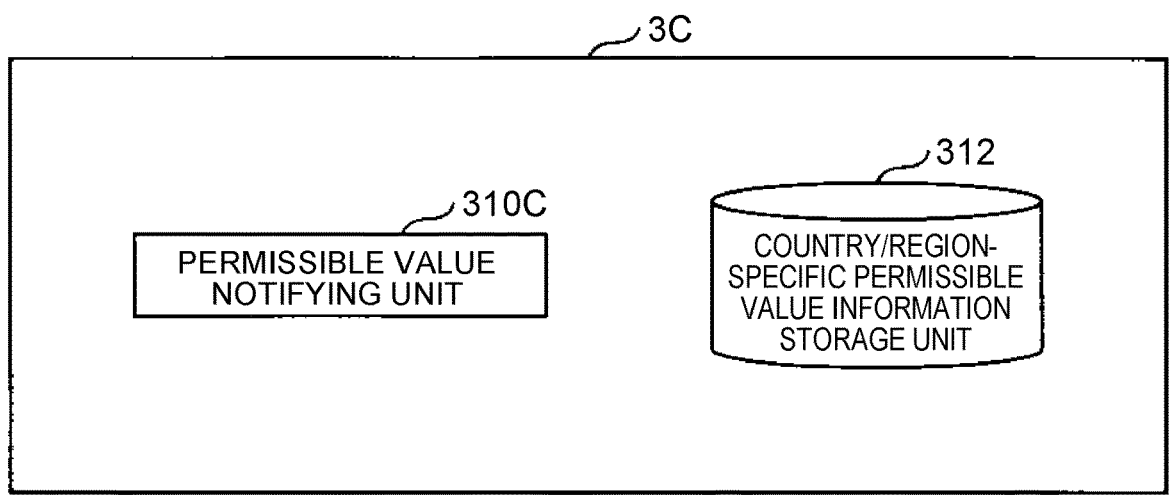

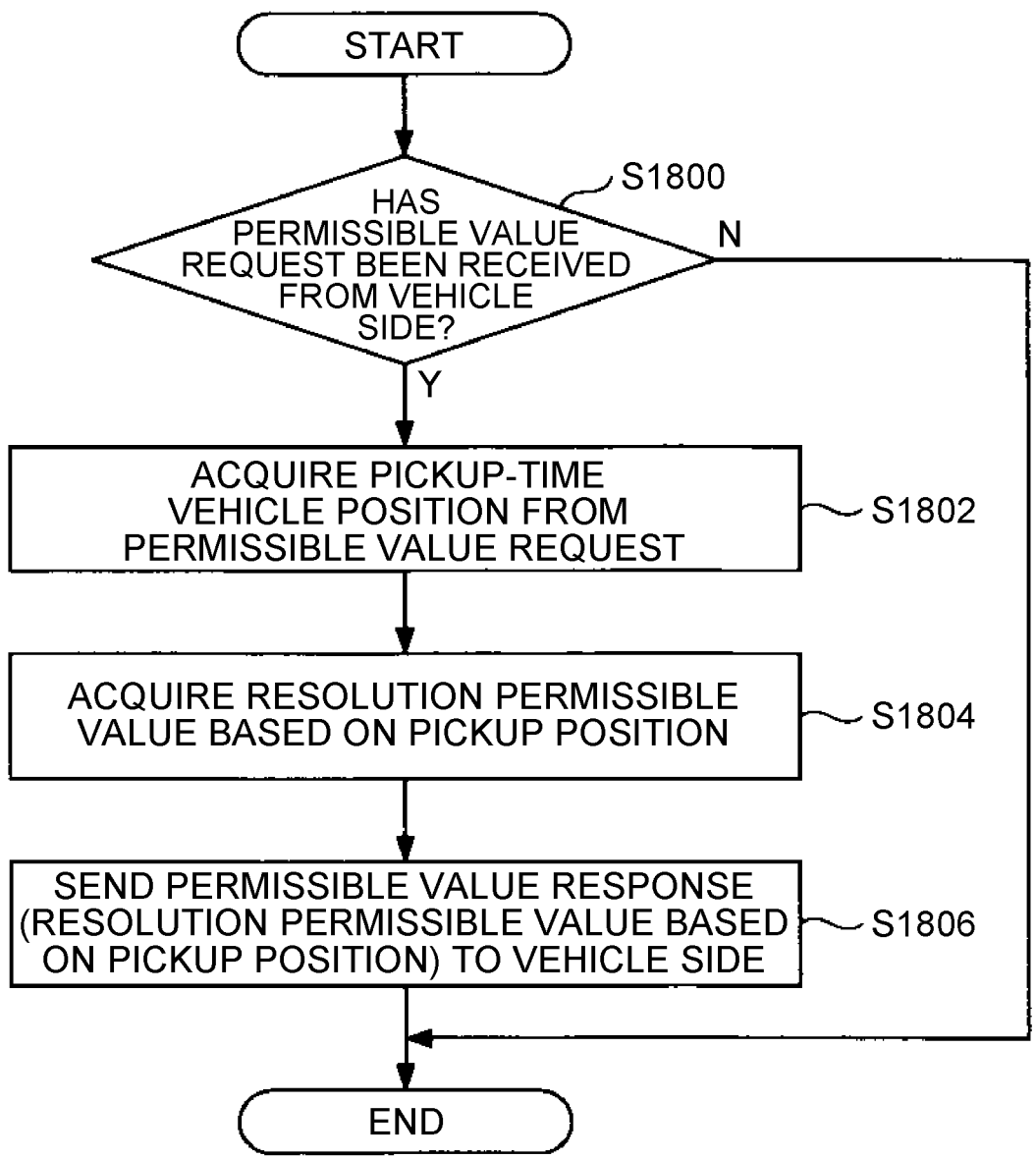

IMAGE PROCESSING SYSTEM FOR ACQUIRING AN IMAGE PICKED UP BY A CAMERA PROVIDED IN A VEHICLE AN IMAGE PROCESSING METHOD EXECUTED BY A COMPUTER AND A NON-TRANSITORY STORAGE MEDIUM STORING AN IMAGE PROCESSING PROGRAM EXECUTED BY A COMPUTER

INCORPORATION BY REFERENCE

The disclosure of Japanese Patent Application No. 2017-045351 filed on Mar. 9, 2017 including the specification, drawings and abstract is incorporated herein by reference in its entirety.

BACKGROUND

1. Technical Field

The disclosure relates to an image processing system, an image processing method executed by a computer and a storage medium holding an image processing program executed by a computer.

2. Description of Related Art

There is known an authentication system that performs a determination of whether a managed object such as a construction machine can be used, using positional information of the managed object (see Japanese Patent Application Publication No. 2008-191825, for example).

SUMMARY

In recent years, many vehicles are equipped with cameras such as a so-called drive recorder. Increase in the resolution of an image picked up by the camera facilitates analyses of traveling environment and the like, but can cause a problem about privacy. Regulations about privacy vary in each country or each region. However, currently, it is not possible to change the resolution of the image picked up by the camera provided in the vehicle, depending on vehicle positions or users (users who analyze the image). The same goes for the color number of the image picked up by the camera. The pixel number of the image and the color number of the image can be collectively referred to as quality of the image.

Some aspects of the disclosure provide an image processing system, an image processing method executed by a computer and a non-transitory storage medium storing an image processing program executed by a computer that make it possible to change the quality of the image picked up by the camera provided in the vehicle.

A first aspect of the disclosure provides an image processing system. The image processing system according to the first aspect includes at least one processing circuit configured to acquire an image picked up by a camera, the camera being provided in a vehicle, and perform a quality changing process of decreasing a quality of the image to equal to or lower than a predetermined standard, the predetermined standard being determined based on at least one of a vehicle position at a time when the image is picked up, a vehicle position at a time when the image is output to an external device or a display device, and requestor information that indicates a requestor of an output request of the image.

According to the first aspect, by performing the quality changing process, it is possible to change the quality of the image picked up by the camera provided in the vehicle. Further, it is possible to realize the quality changing process in which regulation about privacy and the requestor of the output request are considered, based on at least one of the vehicle position at the time when the image is picked up, the vehicle position at the time when the image is output to the external device or the display device, and the requestor information that indicates the requestor of the output request of the image.

A second aspect of the disclosure provides an image processing method executed by a computer. The image processing method according to the second aspect includes: acquiring an image picked up by a camera, the camera being provided in a vehicle: and decreasing a quality of the image based on at least one of a vehicle position at a time when the image is picked up, a vehicle position at a time when the image is output to an external device or a display device, and requestor information that indicates a requestor of an output request of the image.

A third aspect of the disclosure provides a non-transitory storage medium storing an image processing program executed by a computer. When the image processing program is executed by the computer, the image processing program causes the computer to perform a method including: acquiring an image picked up by a camera, the camera being provided in a vehicle; and decreasing a quality of the image to equal to or lower than a predetermined standard, the predetermined standard being determined based on at least one of a vehicle position at a time when the image is picked up, a vehicle position at a time when the image is output to an external device or a display device, and requestor information that indicates a requestor of an output request of the image.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 is an explanatory diagram of an image storage unit;

FIG. 4A is a diagram showing exemplary country-region specific permissible value information;

FIG. 4B is a diagram showing exemplary user-specific permissible value information;

FIG. 8B is a part of the flowchart showing an exemplary image output process by an image output processing unit;

FIG. 13 is a diagram showing exemplary functional blocks of a processing device and a server in the embodiment 3;

FIG. 15 is a flowchart showing an exemplary permissible value notifying process by a processing unit of the server;

FIG. 16 is a diagram showing exemplary functional blocks of a processing device and a server in an embodiment 4;

FIG. 18 is a flowchart showing an exemplary permissible value notifying process by a permissible value notifying unit of the server.

DETAILED DESCRIPTION OF EMBODIMENTS

Hereinafter, embodiments will be described in detail with reference to the accompanying drawings.

Embodiment 1

In an embodiment 1, an image processing system includes a processing device 7.

Figure 1:
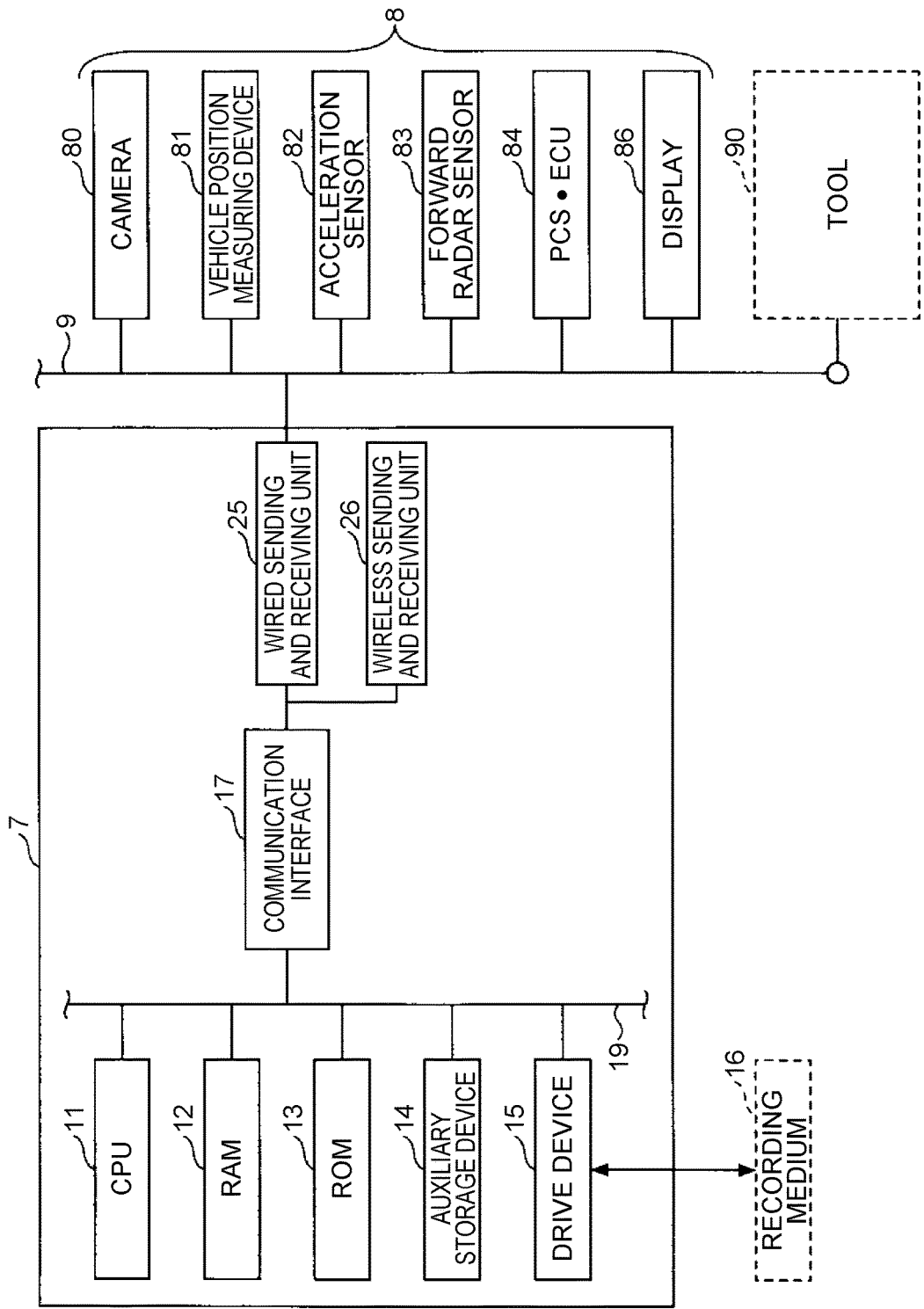
FIG. 1 is a diagram showing an exemplary hardware configuration of an image processing system (processing device) in an embodiment 1.

FIG. 1 is a diagram showing an exemplary hardware configuration of the processing device 7 in the embodiment 1. In FIG. 1, an in-vehicle electronic device group 8 is schematically illustrated in association with the hardware configuration of the processing device 7. The processing device 7 is connected to the in-vehicle electronic device group 8, through a vehicle network 9 such as Controller Area Network (CAN), Local Interconnect Network (LIN) and Ethernet®, for example.

The processing device 7 includes a Central Processing Unit (CPU) 11, a Random Access Memory (RAM) 12, a Read Only Memory (ROM) 13, an auxiliary storage device 14, a drive device 15, and a communication interface 17, which are connected through a bus 19. Further, the processing device 7 includes a wired sending and receiving unit 25 and a wireless sending and receiving unit 26, which are connected to the communication interface 17. In the embodiment 1, unlike an embodiment 3 described later, the wireless sending and receiving unit 26 may be excluded.

The auxiliary storage device 14 is an Electrically Erasable Programmable Read-Only Memory (EEPROM) or an Hard Disk Drive (HDD), for example.

The wired sending and receiving unit 25 includes a sending and receiving unit that can perform communication using the vehicle network such as Controller Area Network (CAN) and Local Interconnect Network (LIN). The wireless sending and receiving unit 26 is a sending and receiving unit that can perform wireless communication using a wireless communication network for mobile phones. The processing device 7 may include a second wireless sending and receiving unit (not illustrated) that is connected to the communication interface 17, in addition to the wired sending and receiving unit 25. In this case, the second wireless sending and receiving unit may include a near field communication (NFC) unit, a Bluetooth® communication unit, a Wireless-Fidelity (Wi-Fi) sending and receiving unit, an infrared sending and receiving unit, and the like.

The processing device 7 may be connectable to a recording medium 16. The recording medium 16 stores a predetermined program. The program stored in the recording medium 16 is installed, for example, in the auxiliary storage device 14 of the processing device 7 through the drive device 15. After the installation, the predetermined program can be executed by the CPU 11 of the processing device 7.

The in-vehicle electronic device group 8 includes a camera 80, a vehicle position measuring device 81, an acceleration sensor 82, a forward radar sensor 83, a PCS (Pre-Crash Safety) ECU (Electronic Control Unit) 84 and the like.

The camera 80 picks up a forward sight from the vehicle (an example of environment around the vehicle). Hereinafter, the image picked up by the camera 80 is referred to as a "forward environment image I" also. The camera 80 may be a camera that picks up a lateral sight from the vehicle, a camera that picks up a rearward sight from the vehicle, a camera that picks up a sight in the vehicle, or the like.

The vehicle position measuring device 81 measures the position of its own vehicle, based on electric waves from Global Navigation Satellite System (GNSS) satellites. The acceleration sensor 82 detects the acceleration applied to a vehicle body. The acceleration sensor 82, for example, detects acceleration components on three axes.

The forward radar sensor 83 detects the situation of a forward obstacle (typically, a forward vehicle) in front of the vehicle, using an electric wave (for example, a millimeter wave), a light wave (for example, a laser) or an ultrasonic wave as a detection wave. The forward radar sensor 83, in a predetermined cycle, detects information indicating relations between the forward obstacle and its own vehicle, for example, the relative speed, distance and lateral position of the forward obstacle with respect to its own vehicle. The forward obstacle information detected by the forward radar sensor 83 in this way is sent to the PCS ECU 84, in a predetermined cycle, for example.

The PCS ECU 84 determines whether an automatic braking start condition is satisfied, based on the information from the forward radar sensor 83. The automatic braking start condition is satisfied when there is a possibility of the collision with the obstacle in front of its own vehicle. The PCS ECU 84 performs an automatic braking control of automatically braking its own vehicle, when the automatic braking start condition is satisfied. For example, in a collision avoidance control with the forward obstacle, the PCS ECU 84 calculates Time to Collision (TTC), which is a time to the collision with the forward obstacle, and determines that the automatic braking start condition is satisfied, when the calculated TTC is below a predetermined threshold Th1 (for example, 1.5 [seconds]). For example, TTC is derived by dividing the distance to the forward obstacle by the relative speed to the forward obstacle.

The automatic braking control is a control of automatically giving braking force to its own vehicle. For example, the automatic braking control is realized by increasing the pressure of a wheel cylinder of each wheel by a brake actuator (an element of the in-vehicle electronic device group 8, not illustrated), in a situation where a driver is not operating a brake pedal. A target control value during execution of the automatic braking control is a value that is determined based on a factor other than the operation amount of the brake pedal.

The PCS ECU 84 may determine whether the automatic braking start condition is satisfied, using the camera 80, instead of or in addition to the forward radar sensor 83. In this case, the camera 80 may be a stereo camera. The PCS ECU 84 includes an image processing device, for example, and recognizes the situation of the forward obstacle as an image. Based on the image recognition result, the PCS ECU 84 can detect the information indicating relations between the forward obstacle and its own vehicle, for example, the relative speed, distance and lateral position of the forward obstacle with respect to its own vehicle, in a predetermined cycle. Image processing functions (for example, a function for calculating the position of the forward obstacle) may be realized by an image processing device that is connected to the PCS ECU 84.

A display 86 is a touch-panel liquid crystal display, for example. The display 86 is disposed at a position allowing an occupant of the vehicle to see the display 86. The display 86 is a display that is fixed to the vehicle, but may be a display of a mobile terminal that can be carried in the vehicle. In this case, the communication between the mobile terminal and the processing device 7 can be realized through the second wireless sending and receiving unit (for example, the Bluetooth communication unit).

The processing device 7 can be connected with a tool 90 (an exemplary external device) through the vehicle network 9.

The tool 90 is an external device that is used for giving an output request of the forward environment image I to the processing device 7 described later. However, the tool 90 may be a general-purpose tool allowing other use applications. The tool 90 includes a special tool that is prepared for a dealer or the like authorized by a vehicle manufacturer, and in addition, may be a tool that can be used by general users. The tool that can be used by general users may be a smartphone or a tablet terminal. The tool 90, ordinarily, is not connected to the vehicle network 9. The tool 90 is connected to the vehicle network 9 for giving the output request to the processing device 7 described later, at the time of the read of the forward environment image I (the image picked up by the camera 80) in an image storing processing unit 724 described later.

Figure 2:
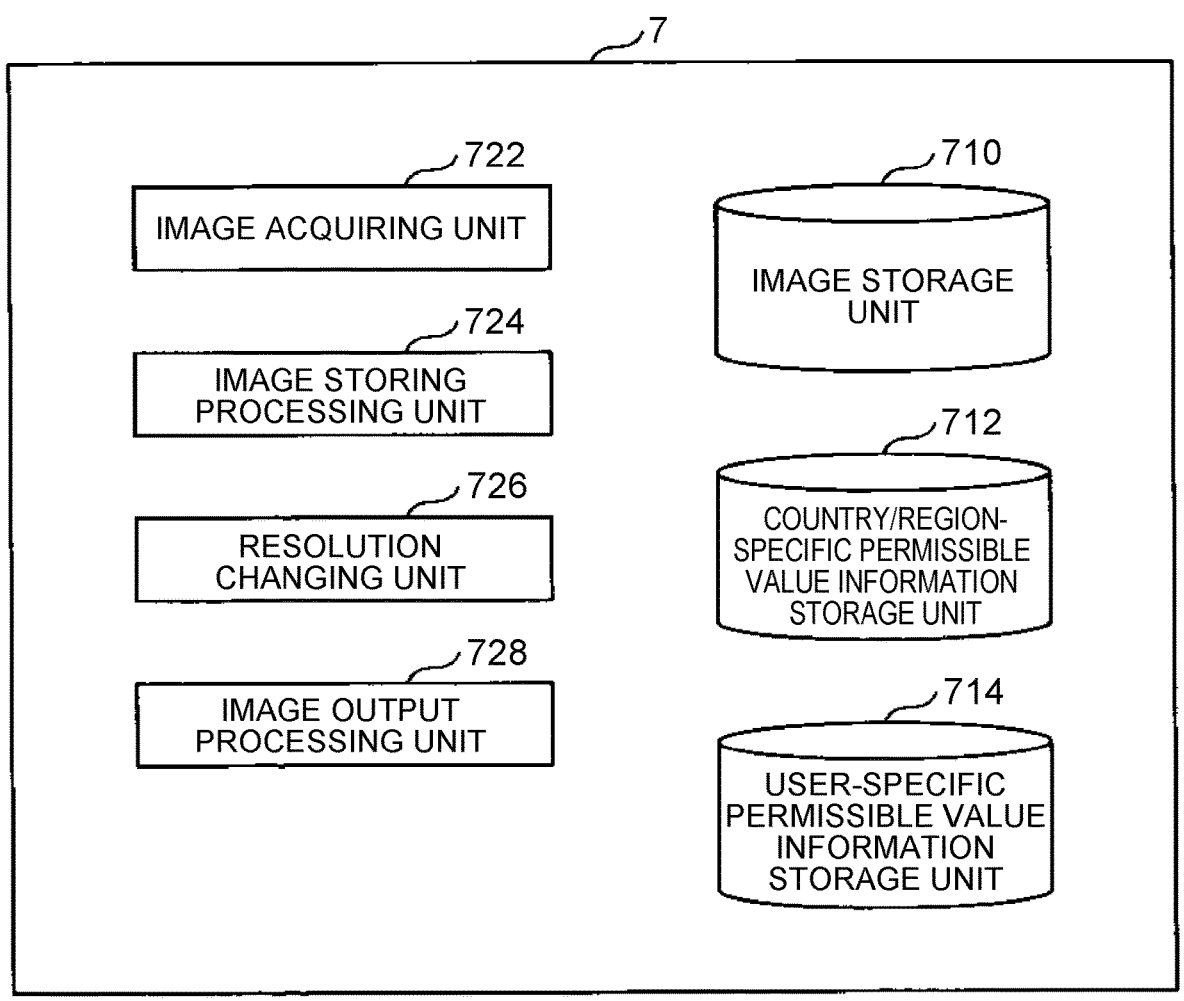
FIG. 2 is a diagram showing an exemplary functional block of the processing device in the embodiment 1.

FIG. 2 is a diagram showing an exemplary functional block of the processing device 7.

The processing device 7 is a device that performs a quality changing process of decreasing the quality of the forward environment image I to equal to or lower than a predetermined standard. The quality of the forward environment image I is a quality that influences the visibility (the discrimination for a physical body or the like) of the image, and the index value for the quality includes the resolution of the image and the color number of the image (the number of colors that can be exhibited by each pixel). The predetermined standard includes a permissible value of the resolution, for example. The permissible value of the resolution is specified by the pixel number per inch (dpi: pixel per inch), for example, but may be specified by an index value of a relation of pixel numbers such as vertical and horizontal pixel numbers, as exemplified by 640×480, 1280×960, Full High Definition (Full HD) and 4K. The quality changing process for decreasing the vertical and horizontal pixel numbers may be a simple shrinking process. Furthermore, the predetermined standard includes a permissible value (an exemplary predetermined color number) of the color number of the image, for example, and is monochrome, 8-bit color or 24-bit color, for example. The color number may be specified, for example, by color depth (bits per pixel (bpp)), which is an index value. The quality changing process for decreasing the color number may be a simple process. The quality changing process may be realized by an irreversible compression process. This is because the irreversible compression process deteriorates the image, and for example, decreases the visibility (clearness and the like) of the image. In this case, the predetermined standard may be specified by compression rate.

For example, the quality changing process includes a process of decreasing both of the resolution and color number of the forward environment image I and a process of decreasing only one of them. Further specific examples of the resolution changing process will be described later. Hereinafter, as an example, it is assumed that the quality changing process is the process of decreasing the resolution of the forward environment image I (the same goes for embodiments 2, 3, 4 described later). When the quality changing process is the process of decreasing the color number or when the quality changing process includes the process of decreasing the color number, the permissible value of the color number may be set in the same manner as the permissible value of the resolution described later (based on the same concept). This is because the color number is the same as the resolution in that the increase in the permissible value increases the visibility of the image, and the color number can be treated similarly to the resolution.

The processing device 7 includes an image storage unit 710, a country-region specific permissible value information storage unit 712, and a user-specific permissible value information storage unit 714. The image storage unit 710, the country-region specific permissible value information storage unit 712 and the user-specific permissible value information storage unit 714 can be realized by the auxiliary storage device 14. Further, the processing device 7 includes an image acquiring unit 722, the image storing processing unit 724, a resolution changing unit 726 (an exemplary quality changing unit), and an image output processing unit 728. The image acquiring unit 722, the image storing processing unit 724, the resolution changing unit 726 and the image output processing unit 728 can be realized when the CPU 11 executes one or more programs in the ROM 13 and the auxiliary storage device 14.

The image storage unit 710 stores the forward environment image I. In the embodiment 1, as an example, the forward environment image I is stored in a recording area in the image storage unit 710, in association with an event ID. The event ID is an Identification (ID) to be provided to an event (described later) that triggers an image storing process of recording the forward environment image I in the recording area. FIG. 3 is a diagram showing an exemplary relation between the even ID and the recording area. In the example shown in FIG. 3, the image storage unit 710 includes a plurality of recording areas (recording areas B1 to B5 in FIG. 3, and others), and image data (image data C1 to C5 in FIG. 3, and others) of the forward environment image I is stored in each recording area. The image data of the forward environment image I is stored in association with the vehicle position at the time when the forward environment image I is picked up. A vehicle position to be stored in association with a piece of image data is a vehicle position at the time when one of a plurality of forward environment images I forming the piece of image data is picked up, for example, a vehicle position for the first forward environment image I of the plurality of forward environment images I forming the piece of image data.

The country-region specific permissible value information storage unit 712 stores country-region specific permissible value information associated with the permissible value of the resolution for each country or each region. The permissible value of the resolution sometimes varies depending on country or region. For example, the permissible value of the resolution is sometimes determined based on a regulation about privacy. The country-region specific permissible value information is previously prepared. FIG. 4A is a diagram showing an example of the country-region specific permissible value information. In FIG. 4A, the permissible value (A1, A2 and others in FIG. 4A) of the resolution is stored for each country/region ID. The country-region specific permissible value information can be changed in accordance with a subsequent change in the regulation about privacy.

The user-specific permissible value information storage unit 714 stores user-specific permissible value information associated with the permissible value of the resolution for each user. FIG. 4B is a diagram showing an example of the user-specific permissible value information. In FIG. 4B, the permissible value (A1, A2 and others in FIG. 4B) of the resolution is stored for each user ID. The user-specific permissible value information can be changed in accordance with a subsequent change in the regulation about privacy.

The image acquiring unit 722 acquires the forward environment image I from the camera 80. The image acquiring unit 722 acquires the forward environment image I from the camera 80 with a predetermined frame period. The image acquiring unit 722 saves the acquired forward environment image I in the image storage unit 710, for example, in a FIFO (First-In, First-Out) fashion. For example, the image acquiring unit 722 writes forward environment images I in a recording period T1, into a rig buffer (not illustrated), in a FIFO fashion.

When a predetermined event is detected, the image storing processing unit 724 records (transfers) the image data (the image data including forward environment images I at a plurality of time points in the recording period T1) stored in the ring buffer, in a predetermined recording area of the image storage unit 710.

Figure 5A:
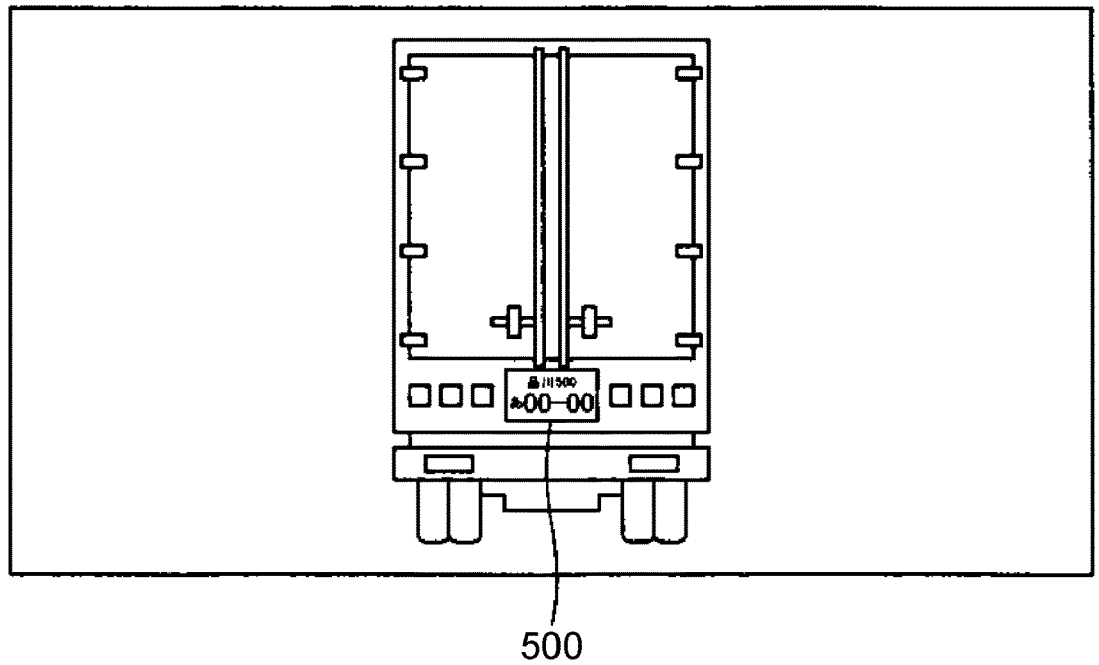
FIG. 5A is an explanatory diagram of a resolution changing process.
Figure 5B:
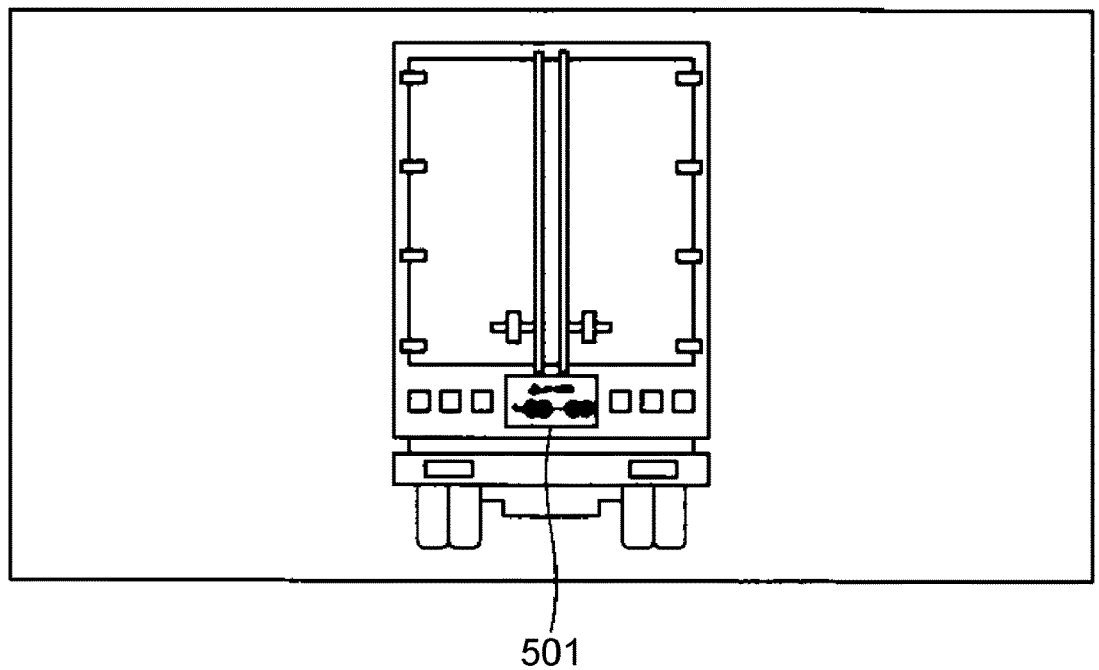
FIG. 5B is an explanatory diagram of the resolution changing process.

The resolution changing unit 726 performs the resolution changing process of decreasing the resolution of the forward environment image I. For example, the resolution changing process may be realized by a process of decimating pixels, or a process (a so-called pyramid process) of averaging four pixels to one pixel. For example, the pyramid process may be realized by forming a Gaussian pyramid as an image pyramid. In the embodiment 1, the resolution changing unit 726 performs the resolution changing process, when the forward environment image I is read from the image storage unit 710 in response to the output request that is externally input through the tool 90. The resolution changing process is a process of changing the resolution of the whole of the forward environment image I, but for example, may be a process of changing the resolution of a part of the forward environment image I, as shown in FIG. 5A and FIG. 5B. FIG. 5A shows the forward environment image I before the resolution changing process, and FIG. 5B shows the forward environment image I after the resolution changing process. In the example shown in FIG. 5A and FIG. 5B, the resolution changing process is executed for a number plate (reference numerals 500, 501) of a forward vehicle, as a part of the forward environment image I.

The resolution changing unit 726 performs the resolution changing process, based on at least one of the vehicle position at the time when the forward environment image I is picked up (hereinafter, referred to as "pickup-time vehicle position"), the vehicle position at the time when the forward environment image I is output to the tool 90 (hereinafter, referred to as "output-time vehicle position"), and a user ID (an example of requestor information indicating a requestor) of a user who performs the output request of the forward environment image I.

For example, the resolution changing unit 726 performs the resolution changing process for the forward environment image I to be read, when the current value of the resolution of the forward environment image I to be read exceeds a permissible value associated with a country or a region containing the pickup-time vehicle position, based on the vehicle position (pickup-time vehicle position) associated with the forward environment image I to be read and the country-region specific permissible value information (see FIG. 4A) in the country-region specific permissible value information storage unit 712. Further, the resolution changing unit 726 performs the resolution changing process for the forward environment image I to be read, when the current value of the resolution of the forward environment image I to be read exceeds a permissible value associated with a country or a region containing the output-time vehicle position, based on the output-time vehicle position and the country-region specific permissible value information in the country-region specific permissible value information storage unit 712. Further, the resolution changing unit 726 performs the resolution changing process, when the current value of the resolution of the forward environment image I to be read exceeds a permissible value associated with a user ID of the requestor, based on the user ID of the user who performs the output request of the forward environment image I and the user-specific permissible value information (see FIG. 4B) in the user-specific permissible value information storage unit 714.

The image output processing unit 728 outputs the forward environment image I in the image storage unit 710, after receiving the output request of the forward environment image I. In the embodiment 1, as an example, the output request is input through the tool 90. The image output processing unit 728 outputs the forward environment image I resulting from the resolution changing process by the resolution changing unit 726, to the tool 90.

According to the embodiment 1, by including the resolution changing unit 726, it is possible to change the resolution of the forward environment image I. That is, according to the embodiment 1, the resolution changing unit 726 performs the resolution changing process when the forward environment image I is read from the image storage unit 710, and thereby, the image output processing unit 728 can output the forward environment image I resulting from the resolution changing process, to the tool 90. Thereby, it is possible to output the forward environment image I, after changing the resolution, in consideration of the regulation about privacy, which can vary in each country or each region, and the user ID of the requestor.

In the above-described embodiment 1, the output request of the forward environment image I is input through the tool 90, and the forward environment image I read from the image storage unit 710 is output to the tool 90. However, the disclosure is not limited to this. For example, the output request of the forward environment image I may be input through the tool 90, and the forward environment image I read from the image storage unit 710 may be output to an external device (for example, a server such as a server 3 in the embodiment 3 and the like) other than the tool 90. In this case, the output to the server can be realized using the wireless sending and receiving unit 26. Further, the output request of the forward environment image I may be input through an external device (for example, a server) other than the tool 90, and the forward environment image I read from the image storage unit 710 may be output to the server that is the output requestor. Alternatively, the output request of the forward environment image I may be input through the tool 90, and the forward environment image I read from the image storage unit 710 may be output (displayed) to the display 86 (an exemplary display device) in the vehicle. Alternatively, the output request of the forward environment image I may be input through a device in the vehicle, and the forward environment image I read from the image storage unit 710 may be output to the display 86 in the vehicle.

Next, with reference to FIG. 6 to FIG. 9, a principal part of an operation example of the image processing system (the processing device 7) in the embodiment 1 will be described with use of flowcharts.

Figure 6:
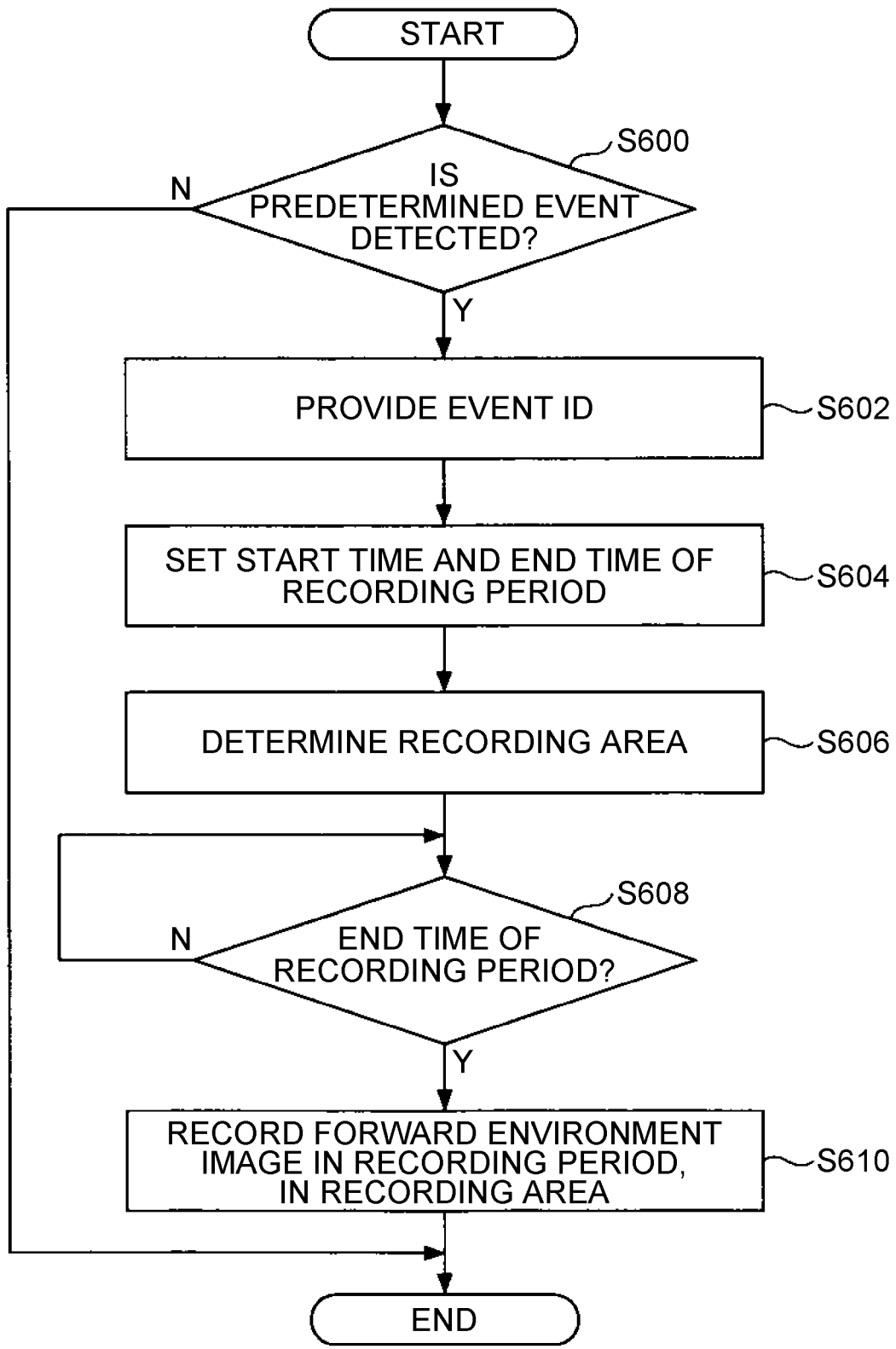
FIG. 6 is a flowchart showing an exemplary image storing process by an image storing processing unit.

FIG. 6 is a flowchart showing an exemplary image storing process by the image storing processing unit 724. For example, the process shown in FIG. 6 is executed in a predetermined cycle, when an ignition switch is in an on-state.

In step S600, the image storing processing unit 724 determines whether a predetermined event is detected. For example, the predetermined event is an event in which a predetermined impact is detected based on the acceleration sensor 82, an event in which parking is started, an event in which TTC becomes equal to or less than a predetermined threshold Th2 (≥the predetermined threshold Th1), or the like. The event in which TTC becomes equal to or less than the predetermined threshold Th2 can be determined based on information from the PCS ECU 84. In the case where the predetermined threshold Th2 is more than the predetermined threshold Th1, the event in which TTC becomes equal to or less than the predetermined threshold Th2 occurs before the satisfaction of the automatic braking start condition. If the determination result is "YES", the process proceeds to step S602. Otherwise, the process in this cycle ends.

In step S602, the image storing processing unit 724 provides an event ID to the detected event.

Figure 7:
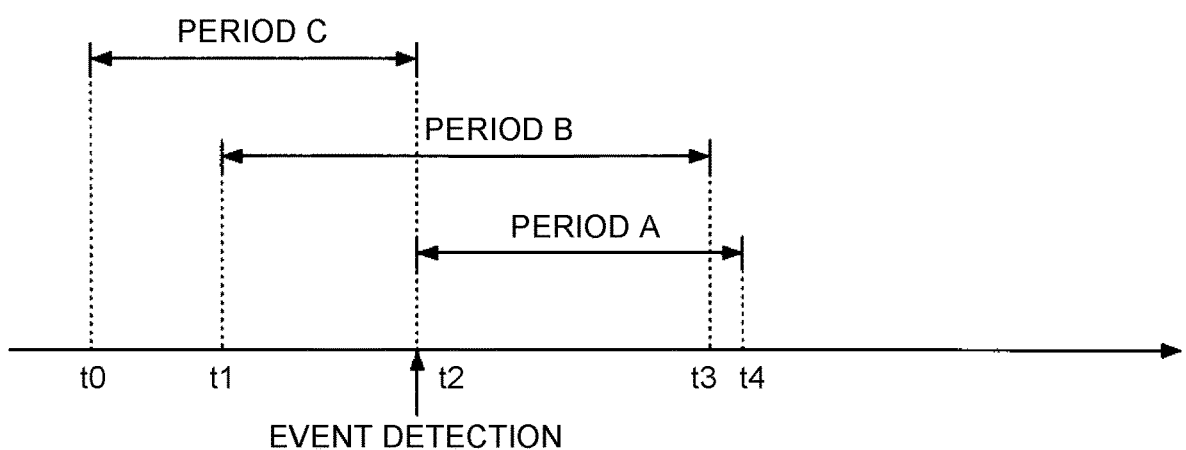
FIG. 7 is an explanatory diagram of a start time and an end time of a recording period T1.

In step S604, the image storing processing unit 724 sets a start time and end time of the recording period T1, depending on the attribute of the detected event. For example, as shown in FIG. 7, the recording period T1 is a period A (t2 to t4) that starts at an event detection time t2, a period C (t0 to t2) that ends at the event detection time t2, or a period B (t1 to t3) that includes the period before and after the event detection time t2.

In step S606, the image storing processing unit 724 determines a recording area (a recording area in the image storage unit 710) that is a recording destination of the image data about the detected event. If there is an available space, the available space is used as the recording area. Here, the number of recording areas is limited (see FIG. 3). In the case where the image data has been already stored in all recording areas, a recording area in which the oldest image data is recorded may be used, or a priority may be provided corresponding to the event ID, for example.

In step S608, the image storing processing unit 724 determines whether it is the end time of the recording period T1 set in step S604 (that is, whether the current time point is the end time of the recording period T1). If the determination result is "YES", the process proceeds to step S610. Otherwise, the processing device 7 becomes a waiting state of waiting for the end time of the recording period T1. Although not illustrated, when the ignition switch is turned off in the waiting state, the process proceeds to step S610, and ends after step S610.

In step S610, the image storing processing unit 724 records (transfers) the forward environment image I in the recording period T1 set in step S604, which is the forward environment image I of the image data stored in the ring buffer, in the recording area determined in step S606. On this occasion, the image storing processing unit 724 associates the event ID provided in step S602, with the recording area determined in step S606, in the image storage unit 710 (see FIG. 3).

According to the image storing process shown in FIG. 6, when the predetermined event occurs, it is possible to store the image data in the recording period T1 depending on the attribute of the event (forward environment images I at a plurality of time points), in the image storage unit 710.

In FIG. 6, the recording period T1 is constant, but the recording period T1 may be changed depending on the attribute of the event. Further, in FIG. 6, the image storage unit 710 includes recording areas in which a plurality of events can be concurrently held, but may be configured to include a recording area in which only a single event can be held.

Figure 8A:
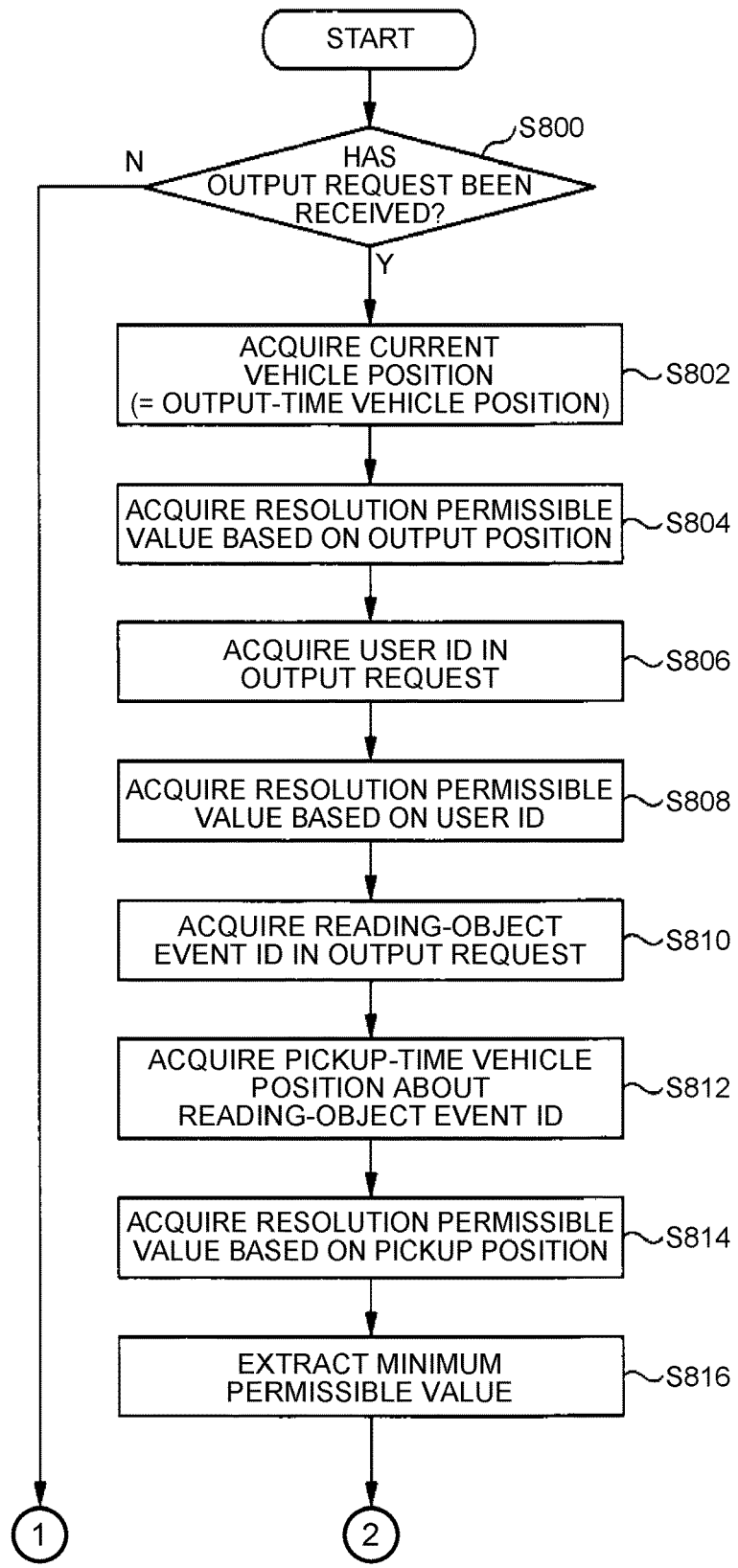
FIG. 8A is a part of a flowchart showing an exemplary image output process by an image output processing unit.

FIG. 8A and FIG. 8B show a flowchart showing an exemplary image output process by the image output processing unit 728. The image output process shown in FIG. 8A and FIG. 8B is executed in a predetermined cycle, in a state where the tool 90 is connected to the vehicle network 9.

Figure 9:
FIG. 9 is an explanatory diagram of an output request.

In step S800, the image output processing unit 728 determines whether the output request has been received from the tool 90. In the embodiment 1, as an example, the output request is sent from the tool 90 to the vehicle network 9, as a sending signal including pieces of information shown in FIG. 9. In FIG. 9, the sending signal includes a sending signal ID, a reading-object event ID and a user ID. The sending signal ID is information allowing the image output processing unit 728 to detect that the type of the sending signal is "output request". The reading-object event ID is information allowing the image output processing unit 728 to specify an event ID in the image storage unit 710 for which the output of the image data is requested. The reading-object event ID may be information designating the recording area of the reading object. For example, a user of the tool 90 may designate the reading-object event ID, based on event information included in diagnostic information that can be extracted using the tool 90. The reading-object event ID may include two or more event IDs. The user ID is relevant to the user as the requestor. The user ID may be an ID that is provided to the tool 90 itself. Alternatively, the user ID may be the same as an ID that is used in authentication of the user for the tool 90. In this case, the user ID for a certain tool 90 varies depending on the user who uses the certain tool 90. If the determination result is "YES", the process proceeds to step S802. Otherwise, the process in this cycle ends.

In step S802, the image output processing unit 728 acquires the current vehicle position (=output-time vehicle position) from the vehicle position measuring device 81.

In step S804, the image output processing unit 728 acquires the permissible value of the resolution that is associated with a country or a region containing the output-time vehicle position, based on the output-time vehicle position acquired in step S802 and the country-region specific permissible value information (see FIG. 4A) in the country-region specific permissible value information storage unit 712. Hereinafter, the permissible value of the resolution acquired in step S804 is referred to as "resolution permissible value based on the output position".

In step S806, the image output processing unit 728 acquires the user ID (see FIG. 9) in the output request acquired in step S800.

In step S808, the image output processing unit 728 acquires the permissible value associated with the user ID of the requestor, based on the user ID acquired in step S806 and the user-specific permissible value information (see FIG. 4B) in the user-specific permissible value information storage unit 714. Hereinafter, the permissible value of the resolution acquired in step S806 is referred to as "resolution permissible value based on the user ID".

In step S810, the image output processing unit 728 acquires the reading-object event ID (see FIG. 9) in the output request acquired in step S800.

In step S812, the image output processing unit 728 acquires the pickup-time vehicle position associated with the event ID about the reading-object event ID, based on the reading-object event ID acquired in step S810 and the data (see FIG. 3) in the image storage unit 710.

In step S814, the image output processing unit 728 acquires the permissible value of the resolution that is associated with a country or a region containing the pickup-time vehicle position, based on the pickup-time vehicle position acquired in step S812 and the country-region specific permissible value information (see FIG. 4A) in the country-region specific permissible value information storage unit 712. Hereinafter, the permissible value of the resolution acquired in step S814 is referred to as "resolution permissible value based on the pickup position".

In step S816, the image output processing unit 728 extracts (selects) the minimum permissible value, from the resolution permissible value based on the output position acquired in step S804, the resolution permissible value based on the user ID acquired in step S808 and the resolution permissible value based on the pickup position acquired in step S814.

In step S818, the image output processing unit 728 determines whether the minimum permissible value acquired in step S816 is lower than the current value of the resolution of the forward environment image I associated with the event ID about the reading-object event ID. The current value of the resolution of the forward environment image I, which is the resolution obtained by the camera 80, has been already acquired. If the determination result is "YES", the process proceeds to step S820. Otherwise, the process proceeds to step S824.

In step S820, the image output processing unit 728 gives the minimum permissible value acquired in step S816, to the resolution changing unit 726, and makes the resolution changing unit 726 execute the resolution changing process. In this case, the resolution changing unit 726 reads all forward environment images I associated with the event ID about the reading-object event ID, from the image storage unit 710, and changes the resolution of the forward environment images I, to the minimum permissible value or to equal to or lower than the minimum permissible value. On this occasion, the resolution changing unit 726, for a certain forward environment image I, may change only the resolution of a particular part of the certain forward environment image I, to the minimum permissible value or to equal to or lower than the minimum permissible value. In this case, the particular part may be a part that can be determined by the regulation about privacy.

In step S822, the image output processing unit 728 outputs the forward environment image I resulting from the resolution changing process in step S820, to the tool 90.

In step S824, the image output processing unit 728 reads all forward environment images I associated with the event ID about the reading-object event ID, from the image storage unit 710, and outputs the forward environment images I to the tool 90, with no change (that is, without performing the resolution changing process).

According to the process shown in FIG. 8A and FIG. 8B, after receiving the output request from the tool 90, the image output processing unit 728 extracts the minimum permissible value of the resolution permissible value based on the output position, the resolution permissible value based on the user ID and the resolution permissible value based on the pickup position, and outputs the forward environment image I having a resolution not higher than the minimum permissible value, to the tool 90. Thereby, it is possible to output the forward environment image I, after changing the resolution, in consideration of the regulation about privacy, which can vary in each country or each region, and the user ID.

In the example shown in FIG. 8A and FIG. 8B, the image output processing unit 728 outputs the forward environment image I having a resolution not higher than the minimum permissible value of the resolution permissible value based on the output position, the resolution permissible value based on the user ID and the resolution permissible value based on the pickup position, to the tool 90, but the disclosure is not limited to this. That is, it is allowable to consider only one or two of the resolution permissible value based on the output position, the resolution permissible value based on the user ID and the resolution permissible value based on the pickup position. For example, in consideration of only the resolution permissible value based on the output position, the image output processing unit 728 may output the forward environment image I having a resolution not higher than the resolution permissible value based on the output position, to the tool 90. Alternatively, the image output processing unit 728 may output the forward environment image I having a resolution not higher than the minimum permissible value of the resolution permissible value based on the output position and the resolution permissible value based in the user ID, to the tool 90.

Embodiment 2

In the embodiment 2, an image processing system includes a processing device 7A. The embodiment 2 is different from the above-described embodiment 1 in timing of the resolution changing process. In the following, characteristic constituents in the embodiment 2 will be mainly described. In the embodiment 2, identical reference characters are assigned to constituent elements that may be the same as those in the above-described embodiment 1, and descriptions thereof will be omitted, in some cases.

Figure 10:
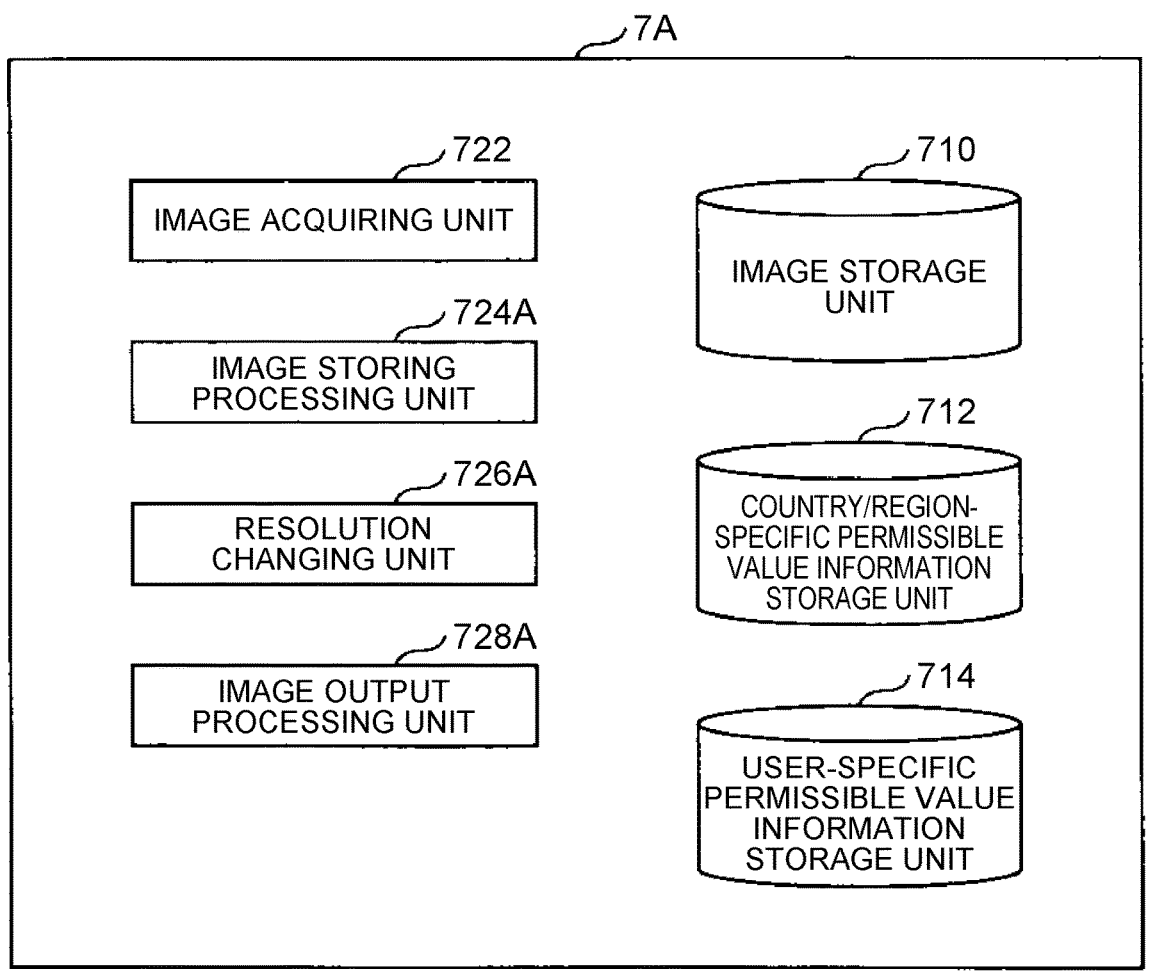
FIG. 10 is a diagram showing an exemplary functional block of an image processing system (processing device) in an embodiment 2.

FIG. 10 is a diagram showing an exemplary functional block of the processing device 7A in the embodiment 2.

The processing device 7A in the embodiment 2 has the same hardware configuration as the processing device 7 in the above-described embodiment 1, but is different in that the image storing processing unit 724, the resolution changing unit 726 and the image output processing unit 728 are replaced with an image storing processing unit 724A, a resolution changing unit 726A (an exemplary quality changing unit) and an image output processing unit 728A, respectively. The image storing processing unit 724A, the resolution changing unit 726A and the image output processing unit 728A can be realized when the CPU 11 executes one or more programs in the ROM 13 and the auxiliary storage device 14.

The image storing processing unit 724A is different from the image storing processing unit 724 in the above-described embodiment 1, in that the forward environment image I is stored in the image storage unit 710 after the resolution changing process by the resolution changing unit 726A. In other words, the resolution changing unit 726A performs the resolution changing process at the time when the forward environment image I is stored in the image storage unit 710. The "time when the forward environment image I is stored in the image storage unit 710" is a concept including a "time just before the forward environment image I is stored in the image storage unit 710" and a "time just after the forward environment image I is stored in the image storage unit 710". The resolution changing process is the same as that in the above-described embodiment 1, except the timing.

The image output processing unit 728A is different from the image output processing unit 728 in the above-described embodiment 1, in that the forward environment image I read from the image storage unit 710 is output to the tool 90 with no change (that is, without performing the resolution changing process), in response to the output request from the tool 90.

According to the embodiment 2, it is possible to obtain the same effect as the above-described embodiment 1. That is, it is possible to output the forward environment image I, after changing the resolution, in consideration of the regulation about privacy, which can vary in each country or each region, and the user ID of the requestor.

In the embodiment 2, the resolution changing unit 726A performs the resolution changing process at the time when the forward environment image I is stored in the image storage unit 710, but the disclosure is not limited to this. For example, the resolution changing unit 726A may perform the resolution changing process at the time after the forward environment image I is stored in the image storage unit 710 and before the forward environment image I is read from the image storage unit 710 in response to the output request.

Next, with reference to FIG. 11, a principal part of an operation example of the image processing system (the processing device 7A) in the embodiment 2 will be described with use of a flowchart.

Figure 11:
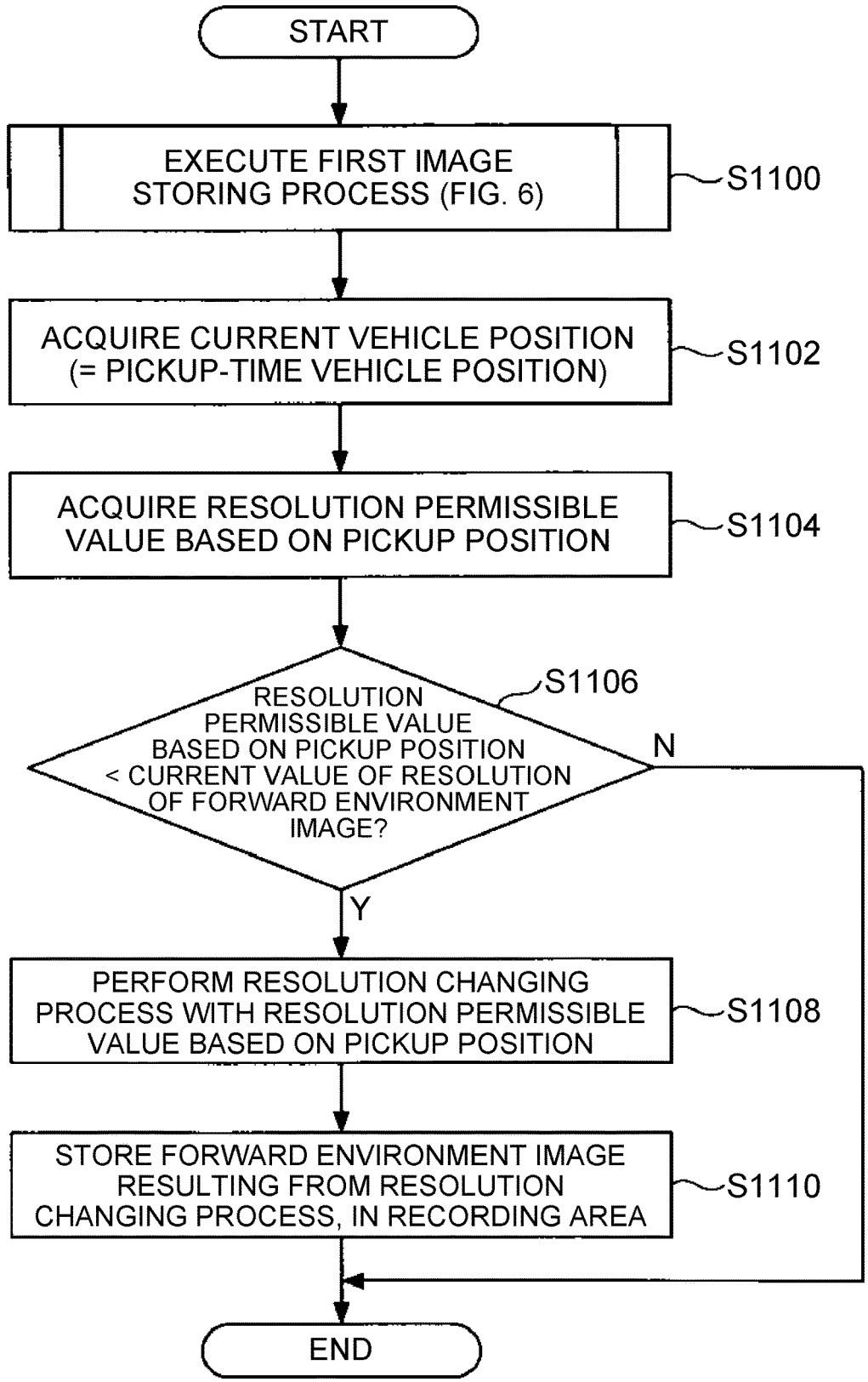
FIG. 11 is a flowchart showing an exemplary image storing process by an image storing processing unit in the embodiment 2.

FIG. 11 is a flowchart showing an exemplary image storing process by the image storing processing unit 724A. For example, the image storing process shown in FIG. 11 is executed in a predetermined cycle, when the ignition switch is in the on-state.

In step S1100, the image storing processing unit 724A executes a first image storing process. The first image storing process is the same as the image storing process (step S600 to step S610) shown in FIG. 6. After step S1100 ends, the process proceeds to step S1102.

In step S1102, the image storing processing unit 724A acquires the current vehicle position (=pickup-time vehicle position) from the vehicle position measuring device 81.

In step S1104, the image storing processing unit 724A acquires the permissible value (the resolution permissible value based on the pickup position) of the resolution that is associated with a country or a region containing the pickup-time vehicle position, based on the pickup-time vehicle position acquired in step S1102 and the country-region specific permissible value information (see FIG. 4A) in the country-region specific permissible value information storage unit 712.

In step S1106, the image storing processing unit 724A determines whether the resolution permissible value based on the pickup position acquired in step S1104 is lower than the current value of the resolution of the forward environment image I associated with the event ID about the reading-object event ID. The current value of the resolution of the forward environment image I, which is the resolution obtained by the camera 80, has been already acquired. If the determination result is "YES", the process proceeds to step S1108. Otherwise, the process ends with no change.

In step S1108, the image storing processing unit 724A gives the resolution permissible value based on the pickup position acquired in step S1104, to the resolution changing unit 726A, and makes the resolution changing unit 726A execute the resolution changing process. In this case, the resolution changing unit 726A reads all forward environment images I in a recording area (a recording area in the image storage unit 710) for the event ID of the detected event, from the image storage unit 710, and changes the resolution of the forward environment images I, to the resolution permissible value based on the pickup position or to equal to or lower than the resolution permissible value based on the pickup position.

In step S1110, the image storing processing unit 724A stores (overwrites) the forward environment image I resulting from the resolution changing process in step S1108, in the recording area (the recording area in the image storage unit 710) for the event ID of the detected event.

According to the process shown in FIG. 11, when the predetermined event occurs, the image storing processing unit 724A can store the forward environment image I resulting from performing the resolution changing process depending on the resolution permissible value based on the pickup position, in the image storage unit 710.

In the process shown in FIG. 11, the image storing processing unit 724A once stores the forward environment image I for the detected event, in the recording area in the image storage unit 710, and then makes the resolution changing unit 726A execute the resolution changing process, but the disclosure is not limited to this. For example, the image storing processing unit 724A may make the resolution changing unit 726A execute the resolution changing process for the forward environment image I in the recording period T1, which is the forward environment image I of the image data stored in the ring buffer, and store the forward environment image I resulting from the resolution changing process, in the recording area in the image storage unit 710.

Embodiment 3

In the embodiment 3, an image processing system includes a processing device 7B and a server 3. That is, the image processing system is provided so as to be divided between the vehicle and the server 3. In the following, characteristic constituents in the embodiment 3 will be mainly described. In the embodiment 3, identical reference characters are assigned to constituent elements that may be the same as those in the above-described embodiment 1, and descriptions thereof will be omitted, in some cases.

Figure 12:
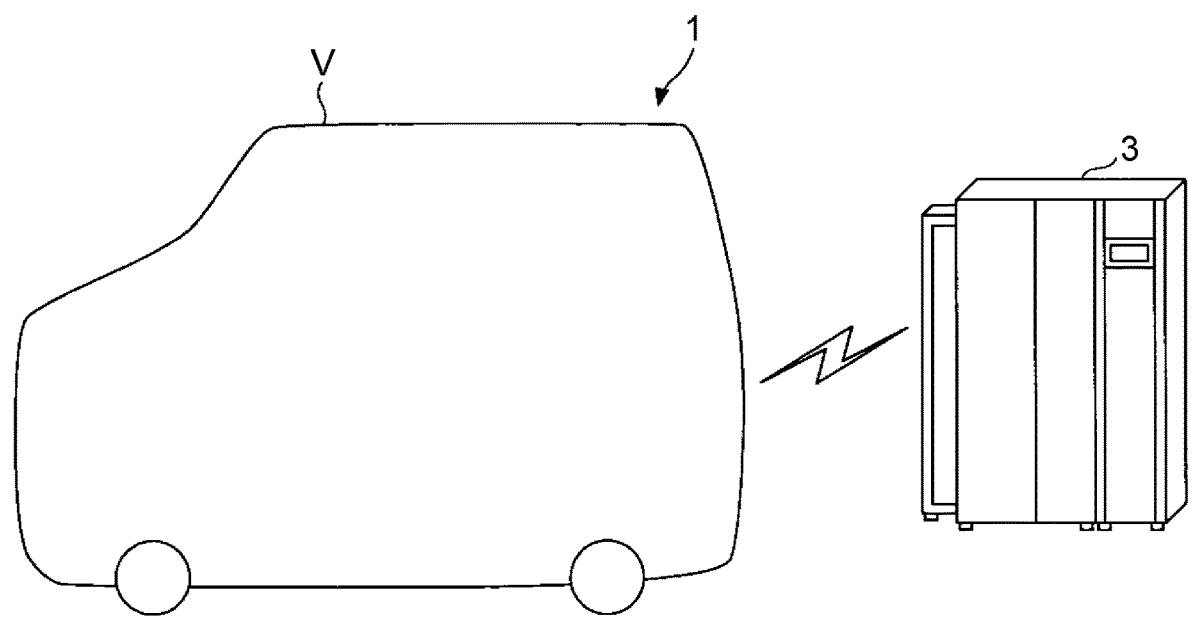
FIG. 12 is a schematic configuration diagram showing an exemplary image processing system in an embodiment 3.

FIG. 12 is a schematic configuration diagram showing an exemplary image processing system 1. The image processing system 1 includes the processing device 7B and the server 3. The processing device 7B and the server 3 can communicate with each other. For example, the processing device 7B includes the wireless sending and receiving unit 26 (see FIG. 1), and thereby, can communicate with the server 3.

FIG. 13 is a diagram showing exemplary functional blocks of the processing device 7B and the server 3.

The processing device 7B in the embodiment 3 has the same hardware configuration as the processing device 7 in the above-described embodiment 1, but is different in that the country-region specific permissible value information storage unit 712 is excluded and the image output processing unit 728 is replaced with an image output processing unit 728B. The image output processing unit 728B can be realized when the CPU 11 executes one or more programs in the ROM 13 and the auxiliary storage device 14.

The image output processing unit 728B is different from the image output processing unit 728 in the above-described embodiment 1, in that the image output processing unit 728B receives a notice of the resolution permissible value based on the output position and the resolution permissible value based on the pickup position, from the server 3.

The server 3 is configured by a physical computer or a virtual computer. The server 3 includes a permissible value notifying unit 310 and a country-region specific permissible value information storage unit 312. The permissible value notifying unit 310 can be realized when a CPU (not illustrated) in the server 3 executes one or more programs in a storage device (not illustrated). The country-region specific permissible value information storage unit 312 can be realized by an auxiliary storage device (not illustrated) in the server 3.

The permissible value notifying unit 310 gives the notice of the resolution permissible value based on the output position and the resolution permissible value based on the pickup position, to the image output processing unit 728B of the processing device 7B, based on data in the country-region specific permissible value information storage unit 312. The data in the country-region specific permissible value information storage unit 312 is the same as the data (see FIG. 4A) in the country-region specific permissible value information storage unit 712.

According to the embodiment 3, it is possible to obtain the same effect as the above-described embodiment 1. That is, it is possible to output the forward environment image I, after changing the resolution, in consideration of the regulation about privacy, which can vary in each country or each region, and the user ID of the requestor. In the embodiment 3, the country-region specific permissible value information storage unit 312 is provided in the server 3, and therefore, when the data in the country-region specific permissible value information storage unit 312 needs to be changed, the data can be changed in the server 3, in a centralized manner.

In the embodiment 3, among the resolution permissible value based on the output position, the resolution permissible value based on the user ID and the resolution permissible value based on the pickup position, the server 3 determines the resolution permissible value based on the output position and the resolution permissible value based on the pickup position, and notifies the processing device 7B. However, the disclosure is not limited to this. Among the resolution permissible value based on the output position, the resolution permissible value based on the user ID and the resolution permissible value based on the pickup position, the server 3 may determine only an arbitrary resolution permissible value, a different combination of two resolution permissible values, or all resolution permissible values, and may notify the processing device 7B.

Next, with reference to FIG. 14A, FIG. 14B and FIG. 15, a principal part of an operation example of the image processing system 1 in the embodiment 3 will be described with use of flowcharts.

Figure 14A:
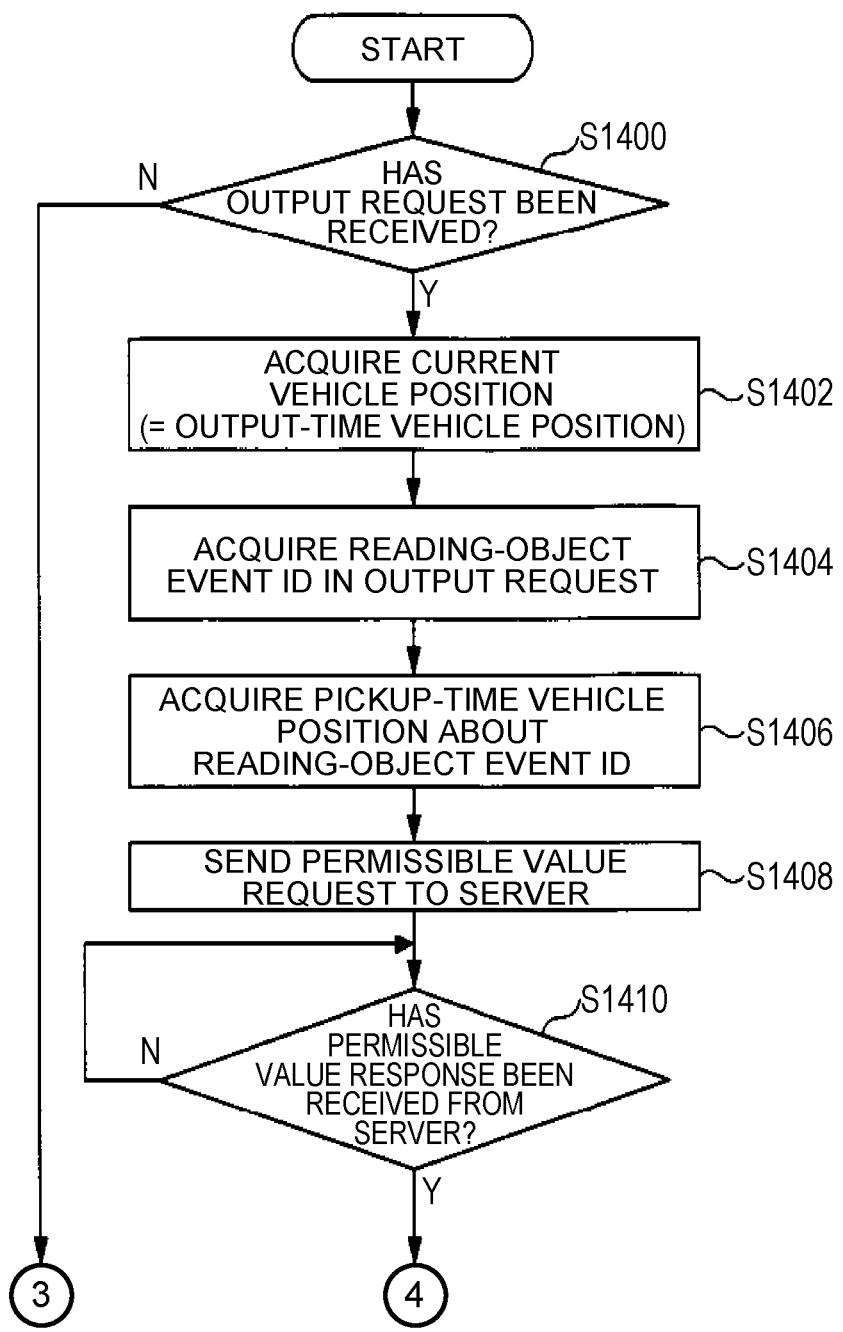
FIG. 14A is a part of a flowchart showing an exemplary image output process by an image output processing unit.
Figure 14B:
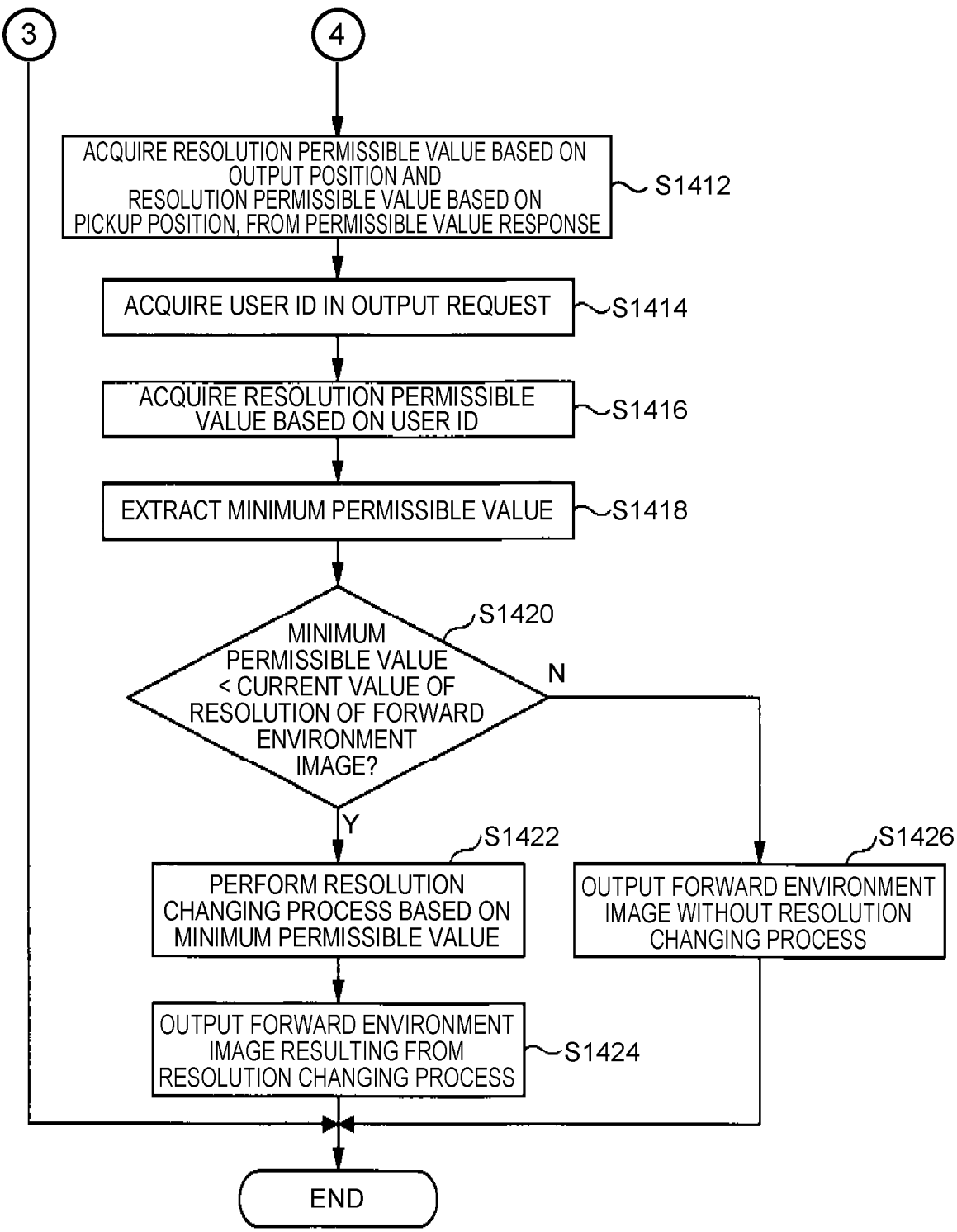
FIG. 14B is a part of the flowchart showing an exemplary image output process by an image output processing unit.

FIG. 14A and FIG. 14B show a flowchart showing an exemplary image output process by the image output processing unit 728B of the processing device 7B. The image output process shown in FIG. 14A and FIG. 14B is executed in a predetermined cycle, in a state where the tool 90 is connected to the vehicle network 9.

In step S1400, the image output processing unit 728B determines whether the output request has been received from the tool 90.

In step S1402, the image output processing unit 728B acquires the current vehicle position (=output-time vehicle position) from the vehicle position measuring device 81.

In step S1404, the image output processing unit 728B acquires the reading-object event ID (see FIG. 9) in the output request acquired in step S1400.

In step S1406, the image output processing unit 728B acquires the pickup-time vehicle position associated with the event ID about the reading-object event ID, based on the reading-object event ID acquired in step S1404 and the data (see FIG. 3) in the image storage unit 710.

In step S1408, the image output processing unit 728B sends a sending signal (hereinafter, referred to as a "permissible value request") for requesting the resolution permissible value based on the output position and the resolution permissible value based on the pickup position, to the server 3, based on the output-time vehicle position acquired in step S1402 and the pickup-time vehicle position acquired in step S1406. The permissible value request includes information allowing the permissible value notifying unit 310 of the server 3 to specify the output-time vehicle position acquired in step S1402 and the pickup-time vehicle position acquired in step S1406. Further, the permissible value request includes information (for example, a vehicle ID or the like) allowing the permissible value notifying unit 310 of the server 3 to specify the vehicle.

In step S1410, the image output processing unit 728B determines whether a response (hereinafter, referred to as a "permissible value response") of the server to the permissible value request sent in step S1408 has been received. If the determination result is "YES", the process proceeds to step S1412. Otherwise, the processing device 7B becomes a waiting state of waiting the permissible value response.

In step S1412, the image output processing unit 728B acquires the resolution permissible value based on the output position and the resolution permissible value based on the pickup position, based on the permissible value response received from the server 3. As described later with reference to FIG. 15, the permissible value response includes information allowing the processing device 7B to acquire the resolution permissible value based on the output position and the resolution permissible value based on the pickup position.

In step S1414, the image output processing unit 728B acquires the user ID (see FIG. 9) in the output request acquired in step S1400.

In step S1416, the image output processing unit 728B acquires the permissible value associated with the user ID of the requestor (the resolution permissible value based on the user ID), based on the ID acquired in step S1414 and the user-specific permissible value information (see FIG. 4B) in the user-specific permissible value information storage unit 714.

In step S1418, the image output processing unit 728B extracts the minimum permissible value, from the resolution permissible value based on the output position and the resolution permissible value based on the pickup position, which are acquired in step S1412, and the resolution permissible value based on the user ID, which is acquired in step S1416.

In step S1420, the image output processing unit 728B determines whether the minimum permissible value acquired in step S1416 is lower than the current value of the resolution of the forward environment image I associated with the event ID about the reading-object event ID. The current value of the resolution of the forward environment image I, which is the resolution obtained by the camera 80, has been already acquired. If the determination result is "YES", the process proceeds to step S1422. Otherwise, the process proceeds to step S1426.

In step S1422, the image output processing unit 728B gives the minimum permissible value acquired in step S1418, to the resolution changing unit 726, and makes the resolution changing unit 726 execute the resolution changing process. Step S1422 is the same as step S820 described above.

In step S1424, the image output processing unit 728B outputs the forward environment image I resulting from the resolution changing process in step S1422, to the tool 90.

In step S1426, the image output processing unit 728B reads all forward environment images I associated with the event ID about the reading-object event ID, from the image storage unit 710, and outputs the forward environment images I to the tool 90, with no change (that is, without performing the resolution changing process).

According to the process shown in FIG. 14A and FIG. 14B, after receiving the output request from the tool 90, the image output processing unit 728B acquires the resolution permissible value based on the output position and the resolution permissible value based on the pickup position, from the server 3. Then, the image output processing unit 728B extracts the minimum permissible value of the resolution permissible value based on the output position, the resolution permissible value based on the pickup position and the resolution permissible value based on the user ID, and outputs the forward environment image I having a resolution not higher than the minimum permissible value, to the tool 90. Thereby, it is possible to output the forward environment image I, after changing the resolution, in consideration of the regulation about privacy, which can vary in each country or each region, and the user ID.

FIG. 15 is a flowchart showing an exemplary permissible value notifying process by the permissible value notifying unit 310 of the server 3. The permissible value notifying process shown in FIG. 15 is executed in a predetermined cycle.

In step S1500, the permissible value notifying unit 310 determines whether the permissible value request (see step S1408 in FIG. 14A) has been received from the processing device 7B of the vehicle. If the determination result is "YES", the process proceeds to step S1502. Otherwise, the process in this cycle ends.

In step S1502, the permissible value notifying unit 310 acquires the output-time vehicle position and the pickup-time vehicle position, based on the permissible value request acquired in step S1500.

In step S1504, the permissible value notifying unit 310 acquires the resolution permissible value based on the output position and the resolution permissible value based on the pickup position, based on the output-time vehicle position and pickup-time vehicle position acquired in step S1502 and the country-region specific permissible value information (see FIG. 4A) in the country-region specific permissible value information storage unit 312. Specifically, the permissible value notifying unit 310 acquires the permissible value of the resolution that is associated with a country or a region containing the output-time vehicle position and the permissible value of the resolution that is associated with a country or a region containing the pickup-time vehicle position, as the resolution permissible value based on the output position and the resolution permissible value based on the pickup position, respectively.

In step S1506, the permissible value notifying unit 310 sends, as the permissible value response, the resolution permissible value based on the output position and the resolution permissible value based on the pickup position, which are acquired in step S1504, to the processing device 7B of the vehicle that has performed the permissible value request.

According to the process shown in FIG. 15, the permissible value notifying unit 310 can give the notice of the resolution permissible value based on the output position and the resolution permissible value based on the pickup position, to the processing device 7B, in response to the permissible value request from the processing device 7B of the vehicle.

In the embodiment 3, the image storage unit 710 may be provided in the server 3. In this case, the image acquiring unit 722 sends the acquired forward environment image I to the server 3. Further, in this case, the functions of the image storing processing unit 724 and the resolution changing unit 726 are realized by the server 3. In this case, the image output processing unit 728B, after receiving the output request from the tool 90, may transfer the output request to the server 3, along with the vehicle position (output-time vehicle position) at that time, and may receive the forward environment image I for output from the server 3, to output the forward environment image I. The server 3 derives the resolution permissible value based on the pickup position, the resolution permissible value based on the user ID and the resolution permissible value based on the output position, based on the pickup-time vehicle position associated with the event ID about the reading-object event ID in the output request, the user ID in the output request, and the output-time vehicle position, respectively. Then, the server 3 generates the forward environment image I for output, depending on the minimum permissible value of the resolution permissible value based on the pickup position, the resolution permissible value based on the user ID and the resolution permissible value based on the output position.

Embodiment 4

In the embodiment 4, an image processing system includes a processing device 7C and a server 3C. In the following, characteristic constituents in the embodiment 4 will be mainly described. In the embodiment 4, identical reference characters are assigned to constituent elements that may be the same as those in the above-described embodiment 3, and descriptions thereof will be omitted, in some cases.

FIG. 16 is a diagram showing exemplary functional blocks of the processing device 7C and the server 3C.

The processing device 7C in the embodiment 4 has the same hardware configuration as the processing device 7 in the above-described embodiment 1, but is different in that the country-region specific permissible value information storage unit 712 is excluded and the image storing processing unit 724, the resolution changing unit 726 and the image output processing unit 728 are replaced with the image storing processing unit 724C, the resolution changing unit 726C (an exemplary quality changing unit) and an image output processing unit 728C, respectively. The image storing processing unit 724C, the resolution changing unit 726C and the image output processing unit 728C can be realized when the CPU 11 executes one or more programs in the ROM 13 and the auxiliary storage device 14.

The image storing processing unit 724C is different from the image storing processing unit 724 in the above-described embodiment 3, in that the forward environment image I is stored in the image storage unit 710 after the resolution changing process by the resolution changing unit 726C. In other words, the resolution changing unit 726C performs the resolution changing process at the time when the forward environment image I is stored in the image storage unit 710. The image storing processing unit 724C receives the notice of the resolution permissible value based on the pickup position, from the server 3C.

The image output processing unit 728C is different from the image output processing unit 728 in the above-described embodiment 1, in that the forward environment image I read from the image storage unit 710 is output to the tool 90 with no change (that is, without performing the resolution changing process), in response to the output request from the tool 90.

The server 3C is different from the server 3 in the above-described embodiment 3, in that the permissible value notifying unit 310 is replaced with a permissible value notifying unit 310C. The permissible value notifying unit 310C can be realized when a CPU (not illustrated) in the server 3C executes one or more programs in a storage device (not illustrated).

The permissible value notifying unit 310C gives the notice of the resolution permissible value based on the pickup position, to the image output processing unit 728C of the processing device 7C, based on the data in the country-region specific permissible value information storage unit 312.

According to the embodiment 4, it is possible to obtain the same effect as the above-described embodiment 3.

In the embodiment 4, the resolution changing unit 726C performs the resolution changing process at the time when the forward environment image I is stored in the image storage unit 710, but the disclosure is not limited to this. For example, the resolution changing unit 726C may perform the resolution changing process at the time after the forward environment image I is stored in the image storage unit 710 and before the forward environment image I is read from the image storage unit 710 in response to the output request.

Next, with reference to FIG. 17 and FIG. 18, a principal part of an operation example of the image processing system 1 in the embodiment 4 will be described with use of flowcharts.

Figure 17:
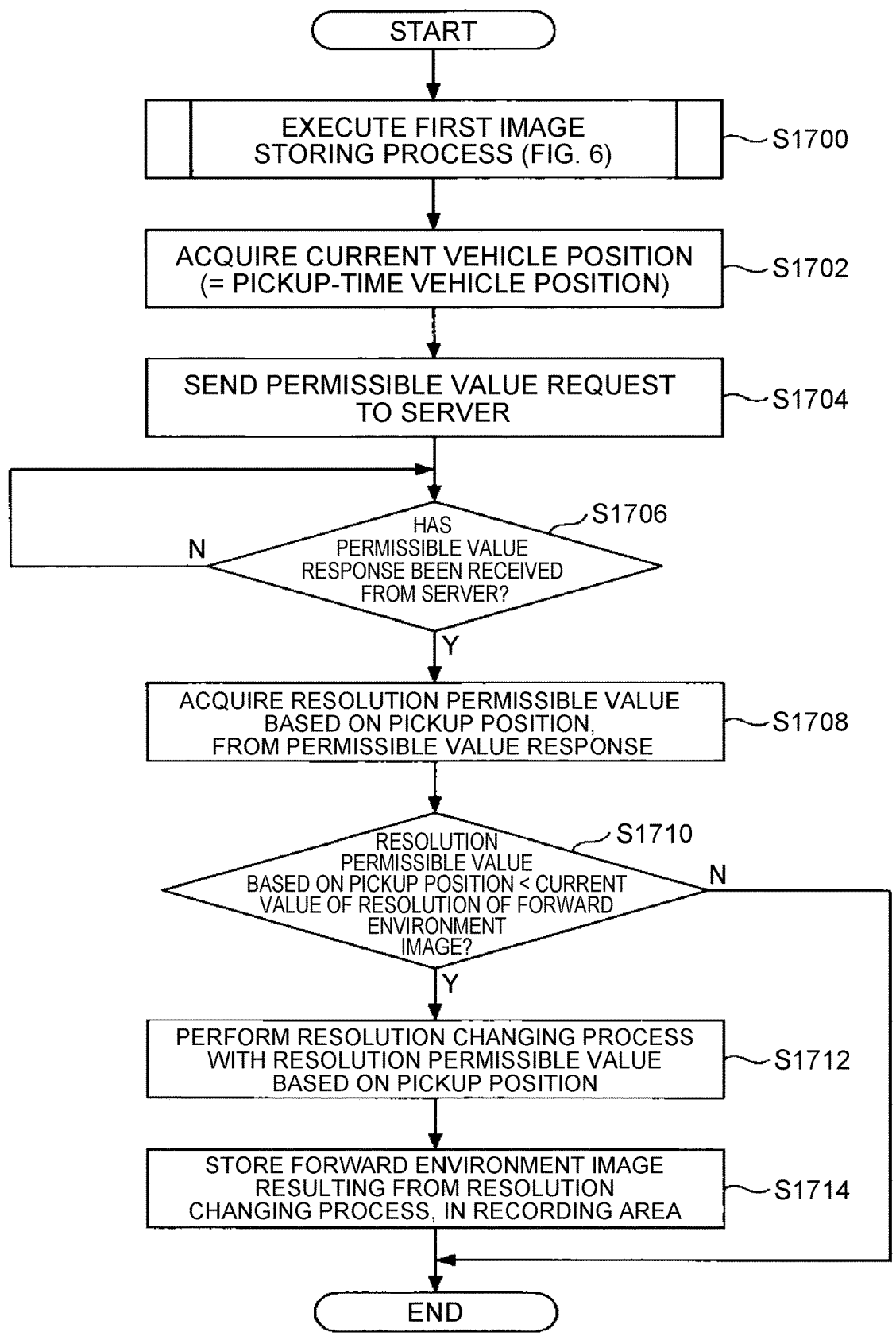
FIG. 17 is a flowchart showing an exemplary image storing process by an image storing processing unit.

FIG. 17 is a flowchart showing an exemplary image storing process by the image storing processing unit 724C. For example, the image storing process shown in FIG. 17 is executed in a predetermined cycle, when the ignition switch is in the on-state.

In step S1700, the image storing processing unit 724C executes the first image storing process. The first image storing process is the same as the image storing process (step S600 to step S610) shown in FIG. 6. After step S1700 ends, the process proceeds to step S1702.

In step S1702, the image storing processing unit 724C acquires the current vehicle position (=pickup-time vehicle position) from the vehicle position measuring device 81.

In step S1704, the image storing processing unit 724C sends a sending signal (permissible value request) for requesting the resolution permissible value based on the pickup position, to the server 3C, based on the pickup-time vehicle position acquired in step S1702. The permissible value request includes information allowing the permissible value notifying unit 310C of the server 3C to specify the pickup-time vehicle position acquired in step S1702. Further, the permissible value request includes information (for example, a vehicle ID or the like) allowing the permissible value notifying unit 310C of the server 3C to specify the vehicle.

In step S1706, the image storing processing unit 724C determines whether a response (permissible value response) of the server to the permissible value request sent in step S1704 has been received. If the determination result is "YES", the process proceeds to step S1708. Otherwise, the processing device 7C becomes a waiting state of waiting the permissible value response.

In step S1708, the image storing processing unit 724C acquires the resolution permissible value based on the pickup position, based on the permissible value response received from the server 3C. As described later with reference to FIG. 18, the permissible value response includes information allowing the processing device 7C to acquire the resolution permissible value based on the pickup position.

In step S1710, the image storing processing unit 724C determines whether the resolution permissible value based on the pickup position acquired in step S1708 is lower than the current value of the resolution of the forward environment image I associated with the event ID about the reading-object event ID. The current value of the resolution of the forward environment image I, which is the resolution obtained by the camera 80, has been already acquired. If the determination result is "YES", the process proceeds to step S1712. Otherwise, the process ends with no change.

In step S1712, the image storing processing unit 724C gives the resolution permissible value based on the pickup position acquired in step S1708, to the resolution changing unit 726C, and makes the resolution changing unit 726C execute the resolution changing process. In this case, the resolution changing unit 726C reads all forward environment images I in a recording area (a recording area in the image storage unit 710) for the event ID of the detected event, from the image storage unit 710, and changes the resolution of the forward environment images I, to the resolution permissible value based on the pickup position or to equal to or lower than the resolution permissible value based on the pickup position.

In step S1714, the image storing processing unit 724C stores (overwrites) the forward environment image I resulting from the resolution changing process in step S1712, in the recording area (the recording area in the image storage unit 710) for the event ID of the detected event.

According to the process shown in FIG. 17, when the predetermined event occurs, the image storing processing unit 724C acquires the resolution permissible value based on the pickup position, from the server 3C. Then, the image storing processing unit 724C can store the forward environment image I resulting from performing the resolution changing process depending on the resolution permissible value based on the pickup position, in the image storage unit 710.

In the process shown in FIG. 17, the image storing processing unit 724C once stores the forward environment image I for the detected event, in the recording area in the image storage unit 710, and then makes the resolution changing unit 726C execute the resolution changing process, but the disclosure is not limited to this. For example, the image storing processing unit 724C may make the resolution changing unit 726C execute the resolution changing process for the forward environment image I in the recording period T1, which is the forward environment image I of the image data stored in the ring buffer, and store the forward environment image I resulting from the resolution changing process, in the recording area in the image storage unit 710.

FIG. 18 is a flowchart showing an exemplary permissible value notifying process by the permissible value notifying unit 310C of the server 3C. The permissible value notifying process shown in FIG. 18 is executed in a predetermined cycle.

In step S1800, the permissible value notifying unit 310C determines whether the permissible value request (see step S1704 in FIG. 17) has been received from the processing device 7C of the vehicle. If the determination result is "YES", the process proceeds to step S1802. Otherwise, the process in this cycle ends.

In step S1802, the permissible value notifying unit 310C acquires the pickup-time vehicle position, based on the permissible value request acquired in step S1800.

In step S1804, the permissible value notifying unit 310C acquires the resolution permissible value based on the pickup position, based on the pickup-time vehicle position acquired in step S1802 and the country-region specific permissible value information (see FIG. 4A) in the country-region specific permissible value information storage unit 312. Specifically, the permissible value notifying unit 310C acquires the permissible value of the resolution that is associated with a country or a region containing the pickup-time vehicle position, as the resolution permissible value based on the pickup position.

In step S1806, the permissible value notifying unit 310C sends, as the permissible value response, the resolution permissible value based on the pickup position acquired in step S1804, to the processing device 7C of the vehicle that has performed the permissible value request.

According to the process shown in FIG. 18, the permissible value notifying unit 310C can give the notice of the resolution permissible value based on the pickup position, to the processing device 7C, in response to the permissible value request from the processing device 7C of the vehicle.

In the embodiment 4, the image storage unit 710 may be provided in the server 3C. In this case, the image acquiring unit 722 sends the acquired forward environment image I to the server 3C. On this occasion, the pickup-time vehicle position for the sent forward environment image I is sent to the server 3C. Further, in this case, the functions of the image storing processing unit 724C and the resolution changing unit 726C are realized by the server 3C. In this case, the image output processing unit 728C, after receiving the output request from the tool 90, may transfer the output request to the server 3C, and may receive the forward environment image I for output from the server 3C, to output the forward environment image I. The server 3C generates the forward environment image I for output depending on the resolution permissible value based on the pickup position, based on the pickup-time vehicle position, and stores the forward environment image I in the image acquiring unit 722. After receiving the output request from the processing device 7C, the server 3C extracts the corresponding forward environment image I for output, from the image acquiring unit 722, and sends the forward environment image I to the processing device 7C.

Thus, the embodiments have been described in detail. The disclosure is not limited to particular embodiments, and various modifications and alterations can be made within the scope of the claims. Further, it is allowable to combine all or some of the constituent elements in the above-described embodiments.

For example, in the above-described embodiment 1 (or embodiment 2, 3 or 4), when a predetermined event occurs, the forward environment image I relevant to the event is stored in the image storage unit 710, but the disclosure is not limited to this. In addition to or instead of this, a plurality of forward environment images I in a predetermined time from the current time point may be constantly stored in the image storage unit 710, in a FIFO fashion.

What is claimed is:

1. An image processing system comprising at least one processing circuit and a memory, the at least one processing circuit configured to:
    acquire an image picked up by a camera, the camera being provided in a vehicle,
    perform a quality changing process of decreasing a quality of the image to equal to or lower than a predetermined standard that is higher than zero, the predetermined standard being determined based on at least one of a vehicle position at a time when the image is picked up, a vehicle position at a time when the image is output to an external device or a display device, and requestor information that indicates a requestor of an output request of the image, and
    store the image in the memory,
    wherein the at least one processing circuit is configured to perform the quality changing process at a time when the image is read from the memory in response to the output request, and
    wherein the at least one processing circuit is configured to perform the quality changing process when a current value of the quality of the image exceeds the predetermined standard associated with a country or a region containing the vehicle position at the time when the image is output to the external device or the display device, based on the vehicle position at the time when the image is output to the external device or the display device and country-region specific information associated with the predetermined standard for each country or each region.

2. The image processing system according to claim 1, wherein
    the at least one processing circuit is configured to perform the quality changing process at a time before the image is stored in the memory, or at a time after the image is stored in the memory and before the image is output to the external device, the display device or the requestor in response to the output request.

3. The image processing system according to claim 1, wherein
    the at least one processing circuit is configured to perform the quality changing process when a current value of the quality of the image exceeds the predetermined standard associated with a user as the requestor, based on the requestor information and user-specific information associated with the predetermined standard for each user.

4. The image processing system according to claim 1, wherein
    the at least one processing circuit is configured to perform the quality changing process when a current value of the quality of the image exceeds the predetermined standard associated with a country or a region containing the vehicle position at the time when the image is picked up, based on the vehicle position at the time when the image is picked up and country-region specific information associated with the predetermined standard for each country or each region.

5. The image processing system according to claim 4, wherein
the at least one processing circuit is provided in the vehicle.

6. The image processing system according to claim 4, wherein
the at least one processing circuit includes a processing circuit provided in the vehicle and a processing circuit provided in a server that is at a position distant from the vehicle.

7. The image processing system according to claim 4, wherein
the at least one processing circuit performs, as the quality changing process, at least one of a process of decreasing a resolution of the image to equal to or lower than a predetermined permissible value and a process of decreasing a color number of the image to equal to or lower than a predetermined color number.

8. The image processing system according to claim 4, wherein
the at least one processing circuit is configured to output an image resulting from the quality changing process, to the external device, the display device or a circuitry possessed by the requestor.

9. The image processing system according to claim 4, wherein the at least one processing circuit is further configured to:
store country-region specific permissible value information associated with the permissible value of the resolution for each country or each region, and the permissible value of the resolution varies depending on the each country or each region.

10. An image processing method executed by a computer, the image processing method comprising:
acquiring an image picked up by a camera, the camera being provided in a vehicle: and
decreasing a quality of the image to equal to or lower than a predetermined standard that is higher than zero based on at least one of a vehicle position at a time when the image is picked up, a vehicle position at a time when the image is output to an external device or a display device, and requestor information that indicates a requestor of an output request of the image,
wherein the decreasing the quality of the image is executed when a current value of the quality of the image exceeds a predetermined standard associated with a country or a region containing the vehicle position at the time when the image is output to the external device or the display device, based on the vehicle position at the time when the image is output to the external device or the display device and country-region specific information associated with the predetermined standard for each country or each region.

11. The image processing method executed by the computer according to claim 10, further comprising
recording the image in a memory.

12. The image processing method executed by the computer according to claim 11, wherein
the decreasing the quality of the image is executed at a time before the image is stored in the memory, or at a time after the image is stored in the memory and before the image is output to the external device, the display device or the requestor in response to the output request.

13. The image processing method executed by the computer according to claim 11, further comprising
reading the image from the memory in response to the output request, wherein
the decreasing the quality of the image is executed at a time before the image is output to the external device, the display device or the requestor in response to the output request.

14. The image processing method executed by the computer according to claim 10, wherein
the decreasing the quality of the image is executed when a current value of the quality of the image exceeds a predetermined standard associated with a user as the requestor, based on the requestor information and user-specific information associated with the predetermined standard for each user.

15. The image processing method executed by the computer according to claim 10, wherein
the decreasing the quality of the image is executed when a current value of the quality of the image exceeds a predetermined standard associated with a country or a region containing the vehicle position at the time when the image is picked up, based on the vehicle position at the time when the image is picked up and country-region specific information associated with the predetermined standard for each country or each region.

16. The image processing method executed by the computer according to claim 10, wherein
the decreasing the quality of the image includes at least one of decreasing a resolution of the image to equal to or lower than a predetermined permissible value and decreasing a color number of the image to equal to or lower than a predetermined color number.

17. The image processing method executed by the computer according to claim 10, the image processing method further comprises:
storing country-region specific permissible value information associated with the permissible value of the resolution for each country or each region, and the permissible value of the resolution varies depending on the each country or each region.

18. A non-transitory storage medium storing an image processing program executed by a computer,
when the image processing program is executed by the computer, the image processing program causes the computer to perform a method comprising:
acquiring an image picked up by a camera, the camera being provided in a vehicle; and
decreasing a quality of the image to equal to or lower than a predetermined standard that is higher than zero, the predetermined standard being determined based on at least one of a vehicle position at a time when the image is picked up, a vehicle position at a time when the image is output to an external device or a display device, and requestor information that indicates a requestor of an output request of the image,
wherein the decreasing the quality of the image is executed when a current value of the quality of the image exceeds a predetermined standard associated with a country or a region containing the vehicle position at the time when the image is output to the external device or the display device, based on the vehicle position at the time when the image is output to the external device or the display device and country-region specific information associated with the predetermined standard for each country or each region.

19. The non-transitory storage medium storing an image processing program executed by a computer according to claim 18, wherein the method further includes:
storing country-region specific permissible value information associated with the permissible value of the resolution for each country or each region, and the permissible value of the resolution varies depending on the each country or each region.

* * * * *